US012579113B2

(12) United States Patent
Johnson et al.

(10) Patent No.: US 12,579,113 B2
(45) Date of Patent: Mar. 17, 2026

(54) BIDIRECTIONAL SCHEMA MODIFICATION ON TREE-STRUCTURED SCHEMAS

(71) Applicant: AT&T Intellectual Property I, L.P., Atlanta, GA (US)

(72) Inventors: Theodore Johnson, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 77 days.

(21) Appl. No.: 17/496,964

(22) Filed: Oct. 8, 2021

(65) Prior Publication Data
US 2023/0113558 A1     Apr. 13, 2023

(51) Int. Cl.
*G06F 16/21* (2019.01)
*G06F 16/22* (2019.01)

(52) U.S. Cl.
CPC ........ *G06F 16/213* (2019.01); *G06F 16/2246* (2019.01); *G06F 16/2282* (2019.01)

(58) Field of Classification Search
CPC . G06F 16/213; G06F 16/2246; G06F 16/2282
See application file for complete search history.

(56) References Cited

U.S. PATENT DOCUMENTS

| | | | | |
|---|---|---|---|---|
| 2004/0239674 A1* | 12/2004 | Ewald | ................. | G06F 16/9024 |
| | | | | 707/E17.011 |
| 2006/0282422 A1* | 12/2006 | Al-Omari | ......... | G06F 16/24544 |
| 2008/0071806 A1* | 3/2008 | Gaurav | ................. | G06F 40/143 |
| 2009/0063530 A1* | 3/2009 | Lee et al. | ............. | G06F 16/957 |
| 2013/0018795 A1* | 1/2013 | Kolhatkar | .......... | G06Q 20/4016 |
| | | | | 705/44 |
| 2016/0246821 A1* | 8/2016 | Meder | ................... | G06F 16/214 |
| 2019/0102389 A1* | 4/2019 | LeGault | ............... | G06F 16/282 |
| 2019/0179638 A1* | 6/2019 | Hao | .................... | G06F 16/9024 |
| 2020/0027556 A1* | 1/2020 | Xie | ......................... | G16H 20/10 |
| 2021/0049167 A1* | 2/2021 | Brushaber | .......... | G06F 16/2455 |
| 2021/0406240 A1* | 12/2021 | Sheppard | ............ | G06F 16/2246 |

* cited by examiner

*Primary Examiner* — Amy Ng
*Assistant Examiner* — Dustin D Eyers
(74) *Attorney, Agent, or Firm* — Guntin & Gust, PLC; Dana B. LeMoine

(57) ABSTRACT

A system for transforming data instances between two tree-structured schemas using a collection of bidirectional tree-structured schema modification operations.

20 Claims, 25 Drawing Sheets

Ietf-interfaces.yang enb

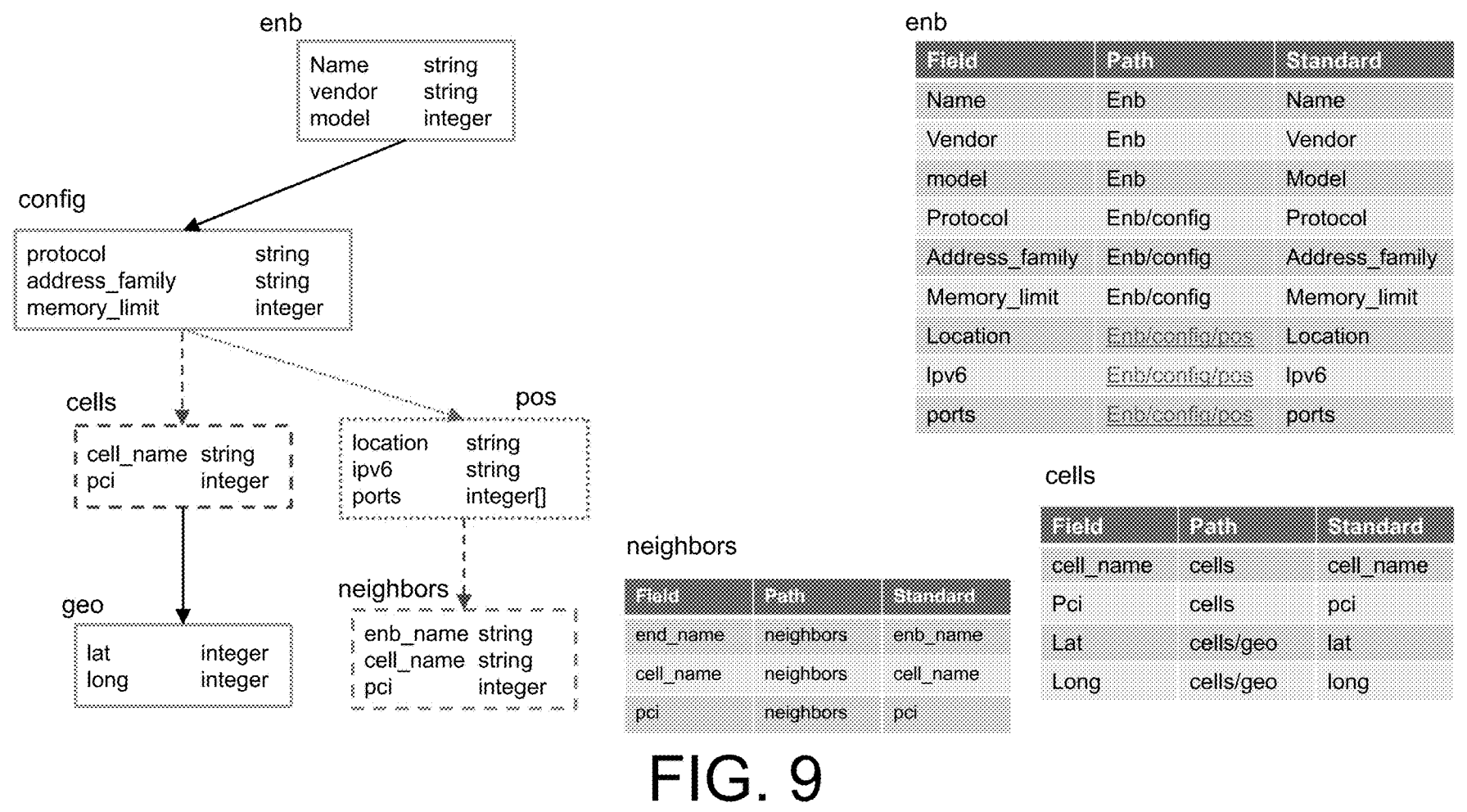

| Field | Path | Standard |
|---|---|---|
| Name | Enb | Name |
| Vendor | Enb | Vendor |
| model | Enb | Model |
| Protocol | Enb/config | Protocol |
| Address_family | Enb/config | Address_family |
| Memory_limit | Enb/config | Memory_limit |
| Location | Enb/config/pos | Location |
| Ipv6 | Enb/config/pos | Ipv6 |
| ports | Enb/config/pos | ports | cells

| Field | Path | Standard |
|---|---|---|
| cell_name | cells | cell_name |
| Pci | cells | pci |
| Lat | cells/geo | lat |
| Long | cells/geo | long | neighbors

| Field | Path | Standard |
|---|---|---|
| enb_name | neighbors | enb_name |
| cell_name | neighbors | cell_name |
| pci | neighbors | pci | enb

| Name | string |
|---|---|
| vendor | string |
| model | integer | config

| protocol | string |
|---|---|
| address_family | string |
| memory_limit | integer | pos

| location | string |
|---|---|
| ipv6 | string |
| ports | integer[] | cells

| cell_name | string |
|---|---|
| pci | integer | geo

| lat | integer |
|---|---|
| long | integer | neighbors

| enb_name | string |
|---|---|
| cell_name | string |
| pci | integer |

FIG. 9

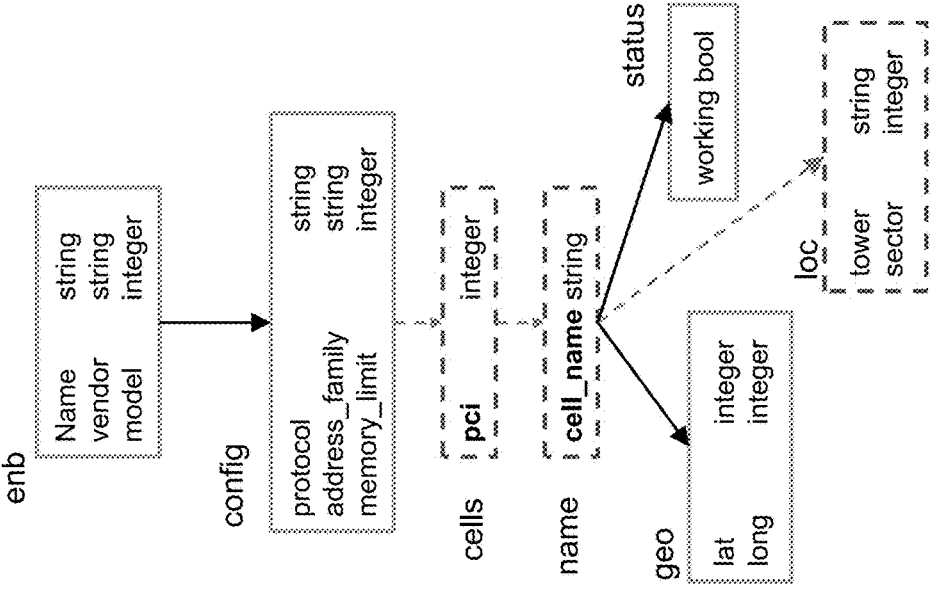
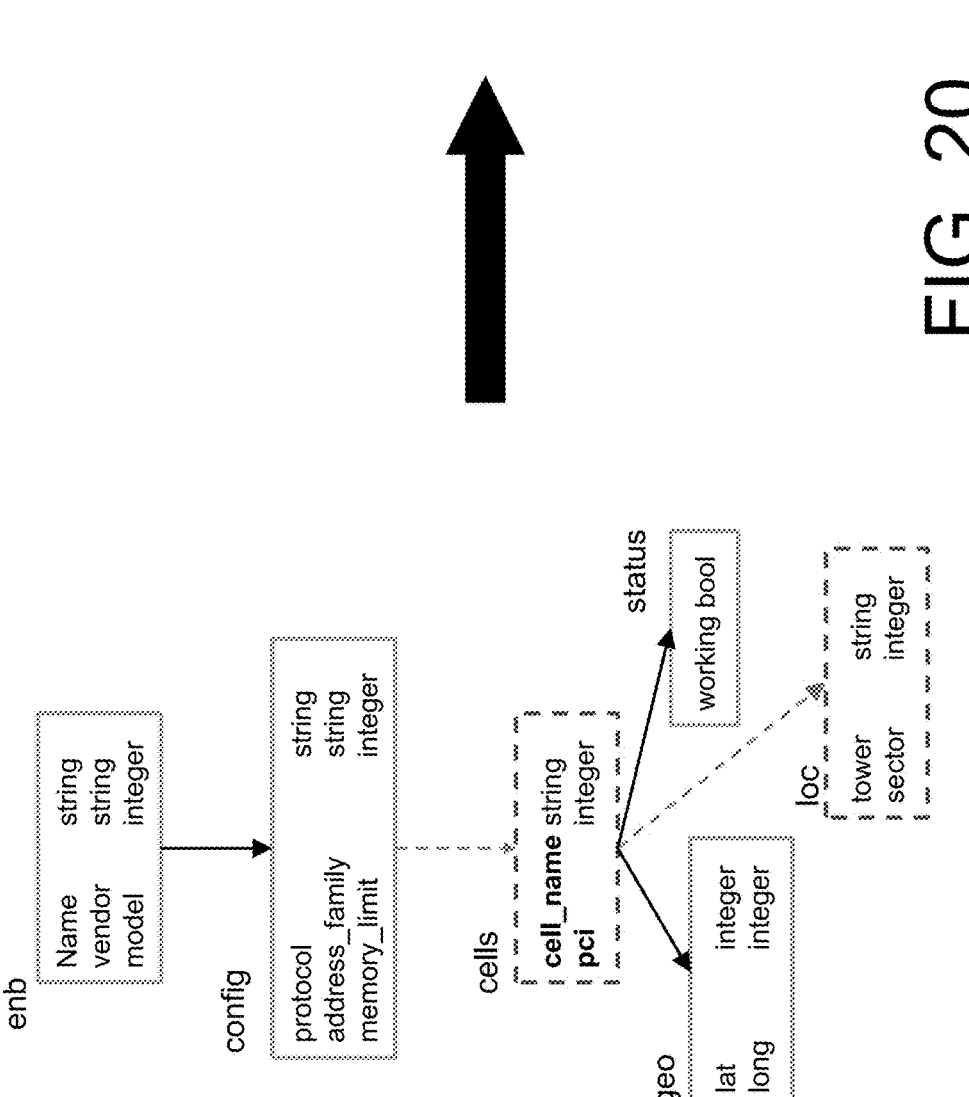
FIG. 20

Receiving a request to transform a schema

211

Determining the schema is a tree-structured schema

212

Using a BiDEL SMOs to transform data instances of the schema

213

BIDIRECTIONAL SCHEMA MODIFICATION ON TREE-STRUCTURED SCHEMAS

BACKGROUND

Creating and managing data schema is generally regarded as a difficult task. As an application's use grows and its feature set changes, its data schema's flaws and limitations become too significant to ignore, leading to a new version of a schema. For this reason, data schemas are often given version identifier, e.g., version 1, version 1.2.3, etc.

Managing schema updates is generally considered a difficult problem, as the existing data in e.g., version 1 must be changed to fit the schema of version 2. One estimate is that data migration accounted for 31% of IT budgets in 2011, with multiple schema management accounting for a significant fraction of this cost.

For Relational Databases, one approach to managing this change is to use Schema Modification Operations (SMO), which are step-by-step instructions for changing the schema from version 1 to version 2. By applying these changes to the data set, the data set can be converted from version 1 to version 2 also. If new data arrives in the version 1 schema, it can be automatically converted into the version 2 schema. Finally, any data which is still in version 1 of the schema can be accessed by code which has been upgraded to version 2.

Below is additional background that includes relational bidirectional SMOs, the basic elements of complex schema languages such as YANG, JSON Schema, and Protocol Buffers, and the difference between tree-structured and non tree-structured schemas.

Relational Schema Modification Operations

First, presented here is a simplified description of a relational database schema. A relational database contains a collection of tables, where each table is a collection of records, and each record has the same collection of named fields (though not all field values need to be present). Each is of a scalar value such as integer, string and so on (extensions to support fields which contain arrays of scalars, or JSON data, are common but they do not change the main narrative). For example, the Data Definition Language declaration of the relational representation of a collection of RRC transfer messages could be:

```
CREATE TABLE rrc_xfer (
    UE_id                string PRIMARY KEY,
    Gnb_id               string,
    Primary_cell_id      integer,
    Rsrp                 numeric,
    Rsrq                 numeric,
    Sinr                 numeric,
);
CREATE TABLE neighbor_cells (
    Ue_id                string,
    Neighbor_cell_id     integer,
    Rsrp                 numeric,
    Rsrq                 numeric,
    Sinr                 numeric,
    CONSTRAINT neighbor_cells_pk PRIMARY KEY(Ue_id,
    Neighbor_cell_id),
    CONSTAINT neighbor_cells_fk FOREIGN KEY (Ue_id)
    REFERENCES
    rrc_xfer(Ue_id)
);
```

As discussed in the introduction, Schema Modification Operations can provide a way to transform a first version of a schema into a second version. These SMOs also provide instructions on how to transform a data set in the tables of an instance of the first version of the schema into an instance of the second version of the schema. A bi-directional SMO also provides instructions on transforming a data set from an instance in the second version of the schema into an instance of the first version of the schema. In this discussion, we will use the material presented in BiDEL.

The BiDEL SMO set may include the following types of SMOs: 1) Create Table R(field1, . . . , fieldn); 2) Drop Table R; 3) Rename table R into R'; 4) Rename field f into f'; 5) Add column f as G(f1, . . . , fn) into R; 6) Drop column f from R with default G(f1, . . . , fn); 7) Decompose table R into S(s1, . . . , sk), T(t1, . . . , TK) On (join condition); 8) Join table S, T into R on (join condition); 9) Split table R into S, T on (condition); or 10) Merge table S, T into R. See K. Hermann, H. Voigt, A. Behrend, J. Rausch, W. Lehner. Living in Parallel Realities—Co-Existing Schema Versions with a Bidirectional Database Evolution Language. Proc. ACM Sigmod Conf 2017, which is incorporated by reference in its entirety.

For example, one might update the rrc transfer schema from version 1 to version 2 by:

1. Changing the name of rrc_xfer.Primary_cell_id to rrc_xfer.Pci;
2. Adding field Last_update to rrc_xfer;
3. Deleting the rrc_xfer.sinr and the neighbor_cells.sinr fields; and
4. Splitting table neighbor_cells into neighbor_cells_even and neighbor_cells_odd on the condition that records with an even value of Neighbor_cell_id go into neighbor_cells_even, and the others go into neighbor_cells_odd.

In this case, the version 2 schema would be as follows (changes underlined):

```
CREATE TABLE rrc_xfer (
    UE_id                string PRIMARY KEY,
    Gnb_id               string,
    Last_update          datetime,
    Pci                  integer,
    Rsrp                 numeric,
    Rsrq                 numeric,
);
CREATE TABLE             neighbor_cells_even (
    Ue_id                               string,
    Neighbor_cell_id                    integer,
    Rsrp                                numeric,
    Rsrq                                numeric,
    CONSTRAINT neighbor_cells_even_pk PRIMARY KEY(Ue_id,
    Neighbor_cell_id),
    CONSTAINT neighbor_cells_odd_fk FOREIGN KEY (Ue_id)
    REFERENCES
    rrc_xfer(Ue_id)
);
CREATE TABLE             neighbor_cells_odd (
    Ue_id                               string,
    Neighbor_cell_id                    integer,
    Rsrp                                numeric,
    Rsrq                                numeric,
    CONSTRAINT neighbor_cells_odd_pk PRIMARY KEY(Ue_id,
    Neighbor_cell_id),
    CONSTAINT neighbor_cells_odd_fk FOREIGN KEY (Ue_id)
    REFERENCES
    rrc_xfer(Ue_id)
);
```

By using the schema evolution scheme described as BiDEL, the data set stored as version 1 can be automatically translated into version 2, and vice versa. Furthermore, a query written using version 2 can execute over data stored as version 1, and vice versa. The machinery for performing these tasks details do not need to be repeated in this disclosure.

Complex Schema Languages

As can be seen in the previous examples, relational schemas are flat, but they rely on foreign key constraints to associate collections of child records (e.g., neighbor cells) with a parent record (e.g., rrc_xfer). In addition, the flat structure of relational records can make it difficult to identify associated information. For example, the collection of measurements in the version 1 rrc transfer schema is (RSRP, RSRQ, SINR), but this association is not obvious from the CREATE TABLE statements.

Complex schema languages allow for a more direct representation of the information structure of an rrc xfer message. For example, the version 1 rrc xfer schema can be expressed in the Protocol Buffers data description language as:

```
message measurement {
    uint32 rsrp = 1;
    uint32 rsrq = 2;
    uint sinr = 3;
}
message neighbor_cell{
    uint32 neighbor_cell_id = 1;
    measurement neighbor_measurement = 2;
}
message rrc_xfer{
    string UE_id = 1;
    string Gnb_id = 2;
    uint32 primary_cell_id = 3;
    measurement primary_measurement = 4;
    repeated neighbor_cell = 5;
}
```

The keyword "repeated" indicates that zero or more neighbor cells can be associated with the rrc_xfer message. By means of these constructions, all information relevant to an rrc_xfer message can be combined in a single package. This property makes complex schema languages desirable for use in transferring data in APIs. Complex schema languages, such as Yang and Protocol Buffers are primarily designed for API descriptions, while JSON Schema is used by the Swagger API definition system.

Tree-Structured Schemas

A tree-structured schema is one in which does not contain any loops in its definitions. So, for example the rrc xfer schema is tree structured. The schema is visualized as a tree, as shown in FIG. 1:

The nodes are the protocol buffer messages, and the links are fields which reference a message. The neighbor_cell message has a long-dash outline to indicate that it's a repeated field. Each link is labeled with the field name leading to the message.

A useful property of a tree-structured schema is that there is always only one path from the root to any particular node. Because of that property, we can label each node in the schema tree with the path of field names to traverse to reach the node. There is no path leading to the root node, so we will give it a name such as root. So, the names of all nodes in the tree are (root, root/primary_measurement, root/neighbor_cells, root/neighbor_cells/neighbor_measurement).

Complex schema languages, such as protocol buffers, can express non tree-structured schemas as well. For example, a User Endpoint might have experienced handovers between cell sites between two successive RRC transfer messages. To capture the prior primary cell measurements, the schema designer might add a facility for the previous measurement data by allowing a neighbor_cell node to contain an rrc_xfer node, as shown in this protocol buffer definition:

```
message measurement {
    uint32 rsrp = 1;
    uint32 rsrq = 2;
    uint sinr = 3;
}
message neighbor_cell{
    uint32 neighbor_cell_id = 1;
    measurement neighbor_measurement = 2;
    rrc_xfer previous_rrc = 3;
}
message rrc_xfer{
    string UE_id = 1;
    string Gnb_id = 2;
    uint32 primary_cell_id = 3;
    measurement primary_measurement = 4;
    repeated neighbor_cell = 5;
}
```

This schema is not tree-structured, as can be seen from its visualization as shown in FIG. 2.

In the visualization of the non tree-structured schema, it is evident that there are many possible paths to the node with the long-dash outline. Some of the shortest of these paths are root/neighbor_cells, root/neighbor_cells/previous_rrc/neighbor_cells, and root/neighbor_cells/previous_rrc/neighbor_cells/previous_rrc/neighbor_cells.

While the self-referential nature of non tree-structured schemas enables a sometimes critical flexibility, they are generally more difficult to understand and work with than tree-structured schemas. Studies have found that the overwhelming majority of complex schemas in open-source repositories are tree-structured. Languages such as Yang will only produce tree-structured schemas.

Because of the complexities produced by non tree-structured schemas, and their relatively rare occurrence, in this disclosure we will address tree-structured schemas.

Keys and Dependencies

Relational schemas languages can embed notions of keys and foreign key dependencies into their schemas. Additional notions of functional dependencies can be introduced. Complex schema languages generally do not have such rich facilities. Some schema languages, such as Yang, allow the user to declare that one or more fields are the key of a list node, but this facility is not universal. Other schema languages, such as JSON Schema and Protocol Buffers, have map constructions. In a map construct, there is a single unnamed scalar field (generally a string but possibly also a float, integer, etc.) which is the key of the list. In this case, the unnamed key field can be given a unique name and designated as the key of the list. If no key is specified, the node itself serves as its key—there can be two nodes of a list node type with exactly the same contents.

If node C is a child of node R, then there is a foreign-key dependence of C to R. More complex dependencies are generally not supported.

This background information is provided to reveal information believed by the applicant to be of possible relevance. No admission is necessarily intended, nor should be construed, that any of the preceding information constitutes prior art.

SUMMARY

The disclosed subject matter describes methods for automating the conversion of semi-structured data from one version to another. In an example, an apparatus may include a processor and a memory coupled with the processor that effectuates operations. The operations may include receiving a request to transform a schema; determining the schema is a tree-structured schema; and based on the determining the schema is a tree-structured schema, using at least one of a plurality of bidirectional tree-structured schema modification operations to transform a data instance of the schema.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 9 illustrates version 2 of the schema after applying Move_node.

FIG. 20 illustrates breaking up a list node with a key.

DETAILED DESCRIPTION

Figure 1:
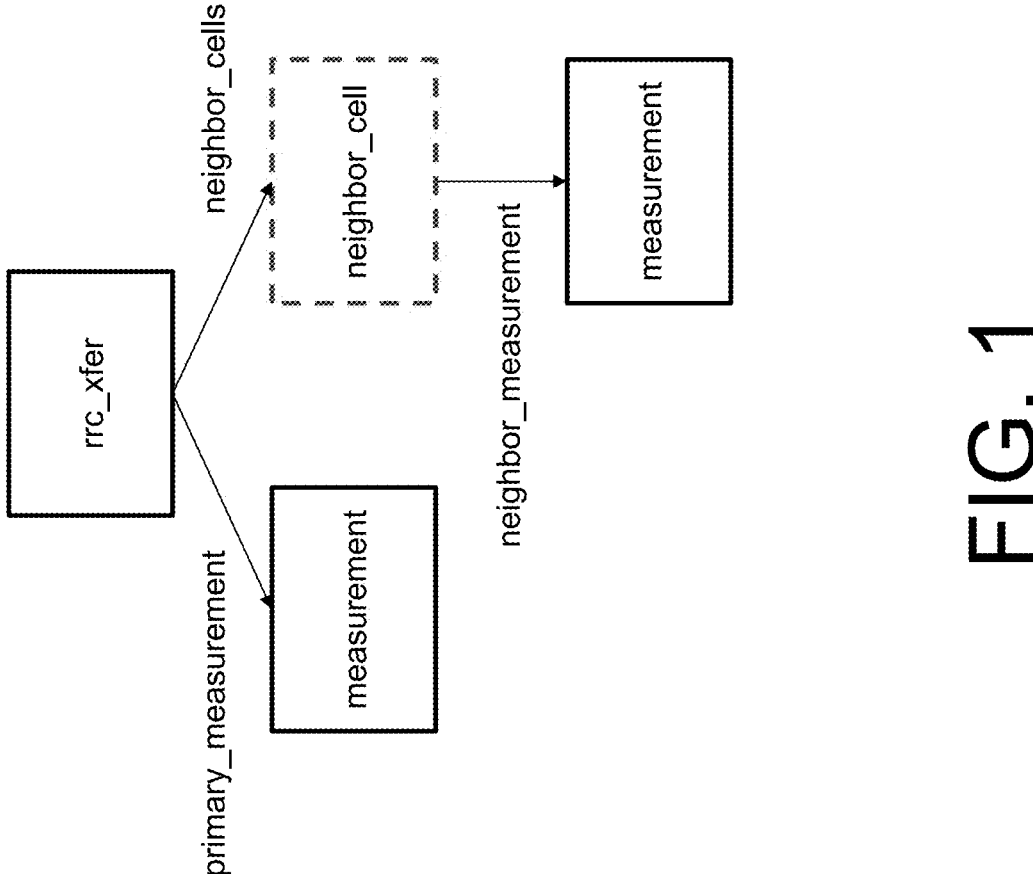
FIG. 1 illustrates tree-structured Schema.
Figure 2:
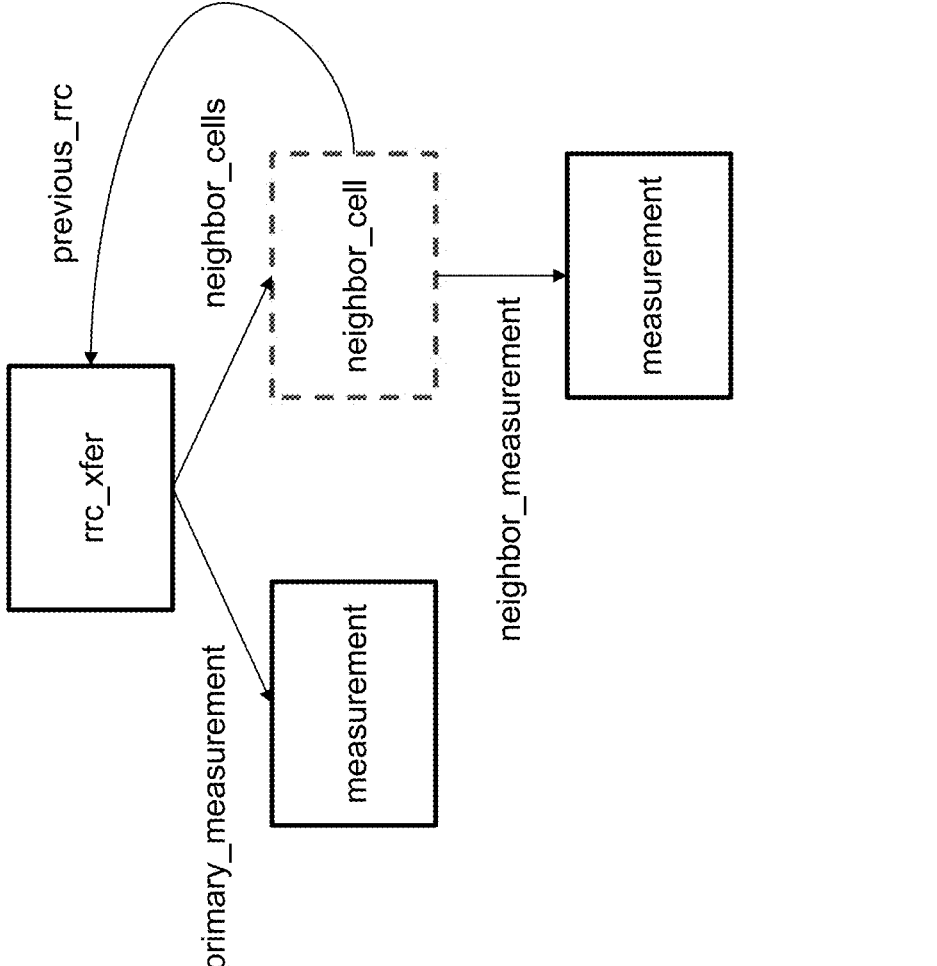
FIG. 2 illustrates non tree-structured schema.

There is a significant problem when converting between versions of schema—a great deal of code has been written to access the data set as schema version 1, and this code must be modified to access the data as schema version 2. All of this code must be rewritten before the database can be converted from schema version 1 to schema version 2. Recent research in the Relational Database community has developed Bidirectional SMOs to reduce this problem. Each SMO has a reverse SMO, so the instructions for converting a schema from version 1 to version 2 also provides the instructions for converting from version 2 to version 1. As a result, data can be stored and accessed in both version 1 and version 2 simultaneously, allowing a great deal of flexibility in bringing all code which accesses and/or supplies data to the database the time to upgrade their code to version 2.

Relational databases have flat schemas—each record is a set of fields and each field is a scalar value, e.g., an integer or a string (with some minor exceptions, e.g., Postgres). However, modern data sets often have more complex schemas. A primary driver of this phenomenon is the need for application programming interfaces (APIs) to clearly and conveniently communicate complex data elements. The API payloads then get collected and stored in a database.

Schema languages such as Yang, JSON Schema, or Protocol Buffers allow the schema developer to define nodes (alternatively, containers, information elements, etc.) which have a collection of fields. These fields might refer to scalar values, or to other nodes, or to lists of other nodes. This kind of hierarchical structuring brings many advantages in managing a data element. For example, all of the fields of a street address (street address, city, state, postal code, country) can be brought together into a single element and used consistently every time a street address is needed. Furthermore, complex and information-rich information structures can be defined. For example, an RRC Transfer message (used in low-level RAN protocols) contains a signal strength measurements (generally a triple RSRP, RSRQ, AND SINR) both for the serving cell, and for all neighboring cells (and for both CSI and SSB signals).

Note that schemas described by languages such as Yang, JSON Schema, Protocol Buffers, and so on, can be highly complex. However, studies have found that most schemas found is open-source repositories are simple "tree-structured" schemas. This disclosure addresses tree-structured schemas. Tree-structured and non tree-structured schemas are described herein.

As with relational database schemas, the complex schemas defined by languages such as Yang, JSON Schema, and Protocol Buffers can evolve, and can have a sequence of versions. Version identification is an explicit part of Yang and Protocol Buffers. An examination of open-source models shows extensive versioning. For example, all of the models in the openconfig github repository except 1 have multiple versions, some have 9 or more revisions. So, the difficulties of updating a relational database schema also apply to complex schemas.

However, the problem of updating the data access code is generally more difficult with complex data schemas than with relational database schemas. Most commonly, users do not write target-language (e.g., SQL) queries on a relational database, but rather access the database through APIs. So, the task of updating the code used to access the database is generally limited to the organization which runs the database.

In the case of complex schemas, the schema definition is often part of the API. For example, Yang is used as the interface language for NETCONF, Protocol Buffers are a data interchange language for APIs, and the core of the popular Swagger system for API generation is a collection of JSON Schema definitions. In a large and disparate organization, it is generally not possible to update all users to the new API definition simultaneously. In practice, a service must support the old as well as the new API for a considerable period of time (e.g., 6 months).

Data migration and multiple schema management has been found to consume a large fraction (31%) of information technology (IT) budgets. Similar or worse problems exist with API management, as 1) multiple API schemas must in general be supported for considerable periods of time, 2) the problem is not contained within a data management organization and instead affects all facets of the IT system infrastructure, or 3) data transformations cannot be managed with the well-developed tools of relational databases, and instead generally involves expensive and error-prone custom coding.

As described in more detail herein, provided are methods by which data can be readily converted between versions of a complex schema, with the conversion working both in the forward (version 1 to version 2) direction as well as the backward (version 2 to version 1) direction, therefore bidrectionally. These methods apply to tree-structured schemas (defined herein) written in languages, such as Yang, JSON Schema, Protocol Buffers, XSD, or ASN.1, etc. Yang, JSON Schema, and Protocol Buffers are used in examples. This technique uses analogues of the bidirectional SMOs described in the relational database literature, and relies on them for the most basic data transformations. The technical effect of using the methods and systems described herein include simplified maintenance of multiple versions of an API, and simplified maintenance of a database of e.g., Yang or JSON Schema data instances—resulting in lower-cost and higher-quality provision of data systems and APIs that use tree-structured schemas.

Translation of a Tree-Structured Schema to a Flat Schema

A larger schema is used as an example, the ietf-interfaces.yang schema, a standard and open-source schema expressed in Yang. This schema is visualized in FIG. 3.

The common complex schema languages (Yang, JSON Schema, protocol buffers, etc.) share many commonalities, but have many differences in the details. In Yang, the list nodes (indicated in long-dash in FIG. 1 and FIG. 3) can have explicitly identified keys. JSON Schema and protocol buffers have similar, though more limited, mechanisms. In addition, each node has its own subschema, unlike the case with protocol buffers in FIG. 1 where a message definition can be used multiple times. So /routing/ribs does not have the same subschema as /routing-state/ribs. There is no explicit name for the root, so it is labeled /.

In spite of these differences in details, tree-structured schemas expressed in Yang, JSON Schema, protocol buffers, etc., have many similarities so that the material in the remainder of this disclosure applies to all of them. The schema in FIG. 3 will be a running example.

In this disclosure, the bidirectional SMOs of Bidel may be applied to tree-structured data. Therefore, it is desirable to transform a tree-structured schema into a flat relational schema in a way which ensures that an instance of the tree structured schema can be transformed into an instance of the relational schema, and back again, with no loss of information, if possible.

Schema Inlining

There are many ways to convert a tree structured schema. Other references describe the basic techniques for semistructured data which does not have a schema or flattening tree-structured data into a universal relation. The material in this section is similar to the hybrid inlining method. However, the methods described in this section are simpler as the schema is assumed to be tree structured, and not a general graph We distinguish between the scalar nodes (solid outlines) in the schema from the list nodes (long-dash outlines). We call the subtree of the root or of a long-dash outlined node and including all black nodes reachable without traversing a long-dash outlined node, and also including the root or long-dash outlined node, the scalar subtree. For example the scalar subtree of the root ends a the first line of long-dash outlined nodes, and the scalar subtree of /routing/control-plane-protocols/control-plane-protocol is the control-plane-protocol and its child static-routes.

Given an instance of the root data element or of a list entry, there can be only one instance of each scalar field in the scalar subtree. For example, /routing has a field router-id, and there will be only one of these in any ietf-interfaces instance. Similarly/routing-state/interfaces has a field interface, and there can be only one of these in any ietf-interfaces instance.

The boundaries of the scalar subtree are the list (long-dash outlined) nodes, as there can be an arbitrary number of them. So, for example there can be many/routing-state/ribs/rib nodes in an ietf-interfaces instance, and there can be many/ routing-state/ribs/rib/routes/route nodes for a given/routing-state/ribs/rib.

Therefore, the scalar fields in the scalar subtree can be considered as fields of the root of the scalar subtree, but with long names. Non-trivial scalar subtrees are common in tree-structured schemas for several reasons. For one, consider the rrx xfer schema described herein. To ensure a consistent representation of signal measurements, and to indicate the common purpose of the measurement fields, they are gathered into a node (protobuf message) and referenced twice. So, in FIG. 1, both rrc_xfer and rrc_xfer/ neighbor_cell have non-trivial scalar subtrees.

Another reason why large scalar subtrees can exist is a separation of concern when building a large complex schema. For example, in FIG. 3, ietf-interfaces has separate sections for routing-state and routing. As a result, the control-plane-protocols of routing-state can be seen to be different than the control-plane-protocols of routing. Further, these two sections of the schema can be developed by different team.

While large scalar subtrees may simplify understanding and writing large complex schemas, and also can ensure consistency in them, for the purpose of schema translation they become an unnecessary complication. Therefore, there is an ability to inline a tree-structured schema by 1. Identifying the scalar subtrees in the schema.
2. For every scalar subtree,
   a. Rename each field which references a scalar value or a list of nodes into a field of the root of the scalar subtree.

Figure 3:
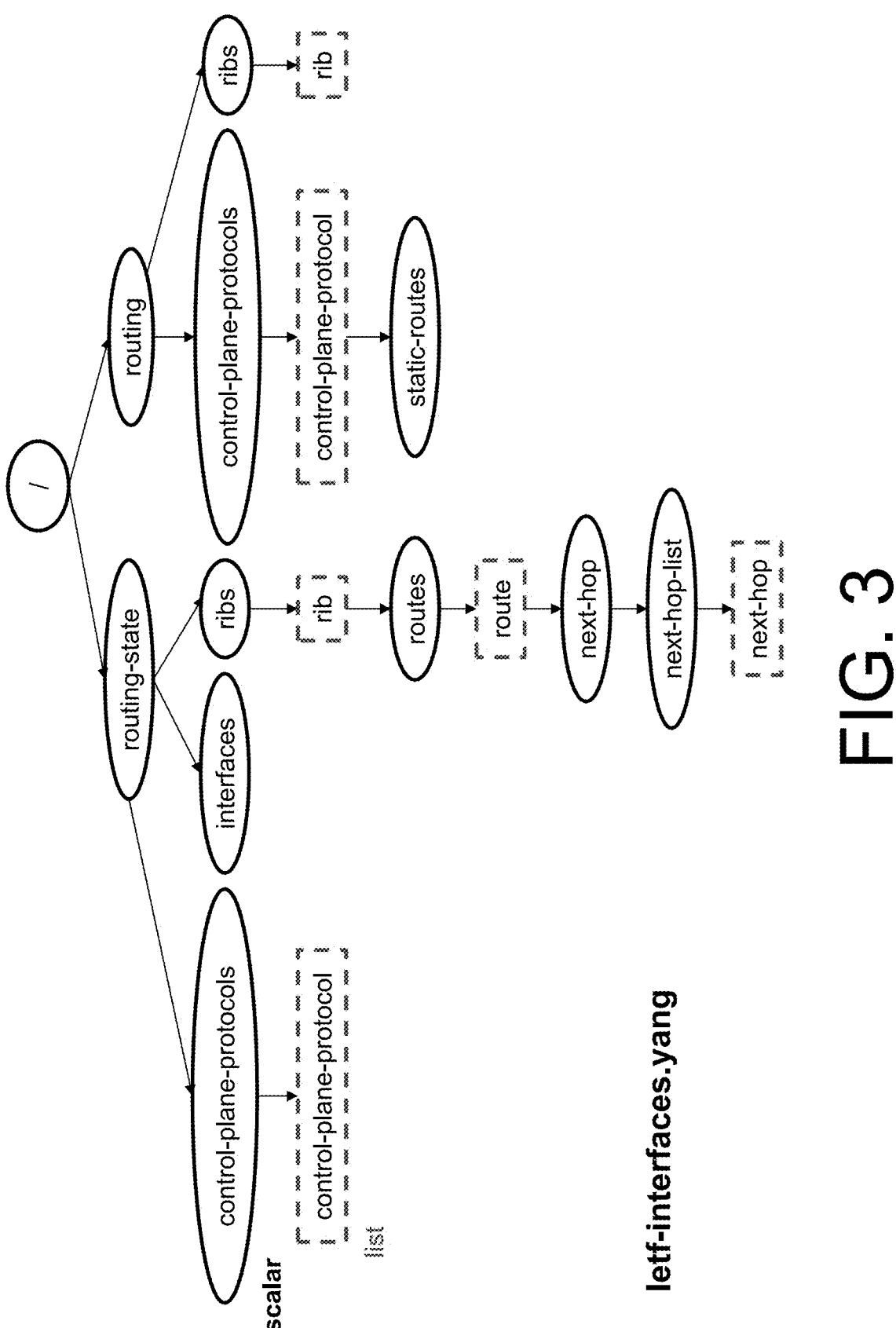
FIG. 3 illustrates example schema.
Figure 4:
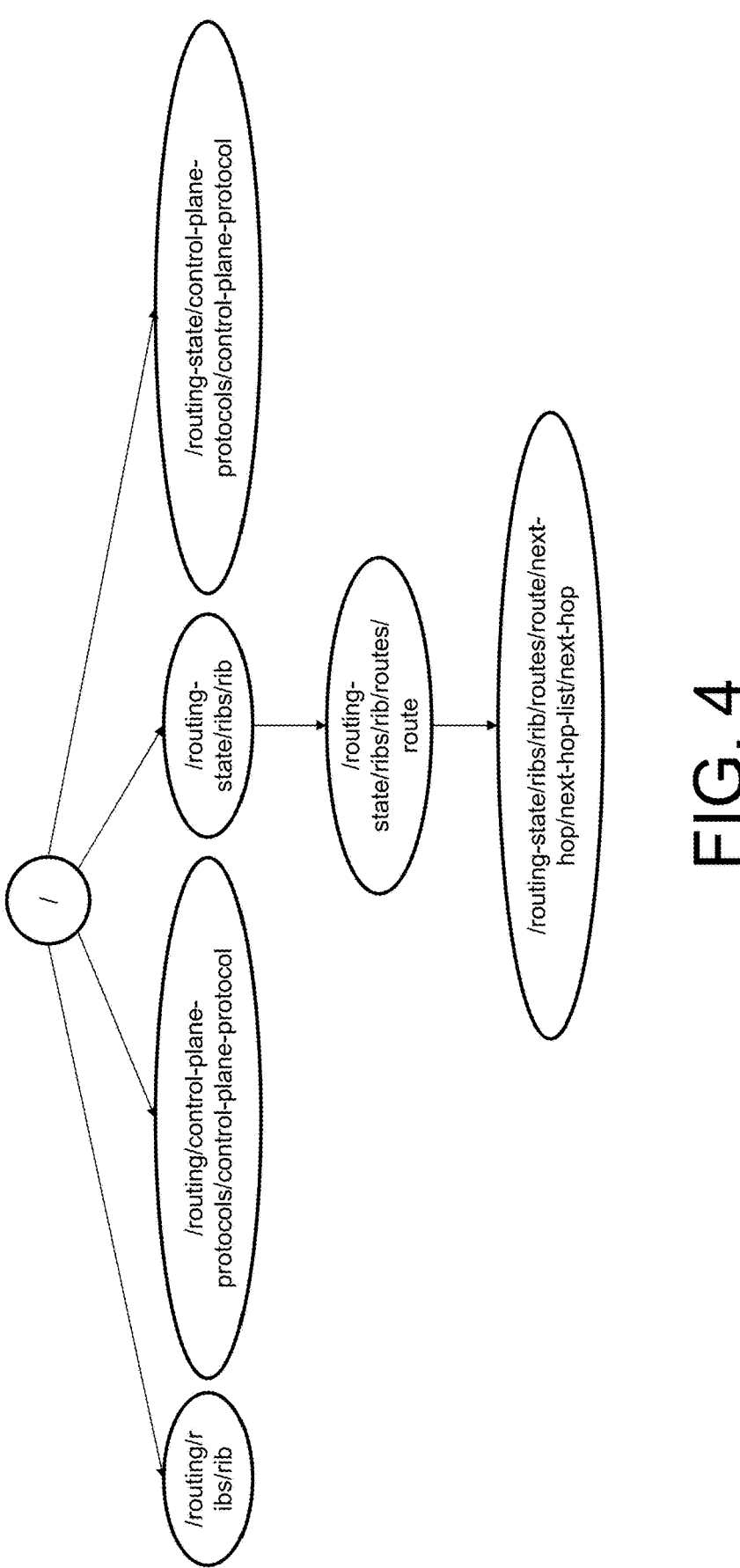
FIG. 4 illustrates inlined schema of ietf-interfaces.

After inlining, the ietf-interfaces of FIG. 3 is transformed into the schema shown in FIG. 4. In this visualization, the nodes are identified by their full paths to avoid name collisions.

The methods and techniques required to construct an inlined schema from a general tree-structured schema will not be discussed further.

Schema languages generally have constraints on their data values. For example, minimum or maximum values, nullable or not null, one-of, and so on. We defer this material to later.

SQL Representation

Many parts of the schema modification operation for tree-structured data rely on their relational counterparts, so it is beneficial to express an inlined tree-structured schema as a relational schema. This relational schema can be used to build a data store for instances of the tree-structured schema, but this step is not required.

For example, the following Table 1 is the set of SQL CREATE TABLE statements for the ietf-interfaces schema:

TABLE 1

```
-- Node /
CREATE TABLE root_(
    id_ bigint UNIQUE,
    interface text[ ],
    routing_state___router_id text,
    routing___router_id text,
    CONSTRAINT pk_root_ PRIMARY KEY(id_)
);
-- Node /routing/ribs/rib
CREATE TABLE rib(
    id_ bigint UNIQUE,
    parent_id_ bigint,
    address_family text,
    name varchar(100),
    description text,
    CONSTRAINT fk_rib FOREIGN KEY (parent_id_) REFERENCES
root_ (id_) ON DELETE CASCADE,
    CONSTRAINT pk_rib PRIMARY KEY(name,parent_id_)
);
-- Node /routing/control-plane-protocols/control-plane-protocol
CREATE TABLE control_plane_protocol(
    id_ bigint UNIQUE,
    parent_id_ bigint,
    type varchar(100),
    name varchar(100),
    description text,
    CONSTRAINT fk_control_plane_protocol FOREIGN KEY
    (parent_id_)
REFERENCES root_ (id_) ON DELETE CASCADE,
    CONSTRAINT pk_control_plane_protocol PRIMARY
    KEY(type,name,parent_id_)
);
-- Node /routing-state/ribs/rib
CREATE TABLE rib_1(
    id_ bigint UNIQUE,
    parent_id_ bigint,
    address_family text,
    default_rib boolean,
    name varchar(100),
    CONSTRAINT fk_rib_1 FOREIGN KEY (parent_id_)
REFERENCES root_ (id_) ON DELETE CASCADE,
    CONSTRAINT pk_rib_1 PRIMARY KEY(name,parent_id_)
);
-- Node /routing-state/ribs/rib/routes/route
CREATE TABLE route(
    id_ bigint UNIQUE,
    parent_id_ bigint,
    active text,
    outgoing_interface text,
    source_protocol text,
    last_updated text,
    route_preference integer,
    CONSTRAINT fk_route FOREIGN KEY (parent_id_)
REFERENCES rib_1 (id_) ON DELETE CASCADE,
    CONSTRAINT pk_route PRIMARY KEY(id_,parent_id_)
);
-- Node /routing-state/ribs/rib/routes/route/next-hop/next-hop-list/next-hop
CREATE TABLE next_hop(
    id_ bigint UNIQUE,
    parent_id_ bigint,
    priority text,
    weight integer,
    outgoing_interface text,
    CONSTRAINT fk_next_hop FOREIGN KEY (parent_id_)
REFERENCES route (id_) ON DELETE CASCADE,
    CONSTRAINT pk_next_hop PRIMARY KEY(id_,parent_id_)
);
-- Node /routing-state/control-plane-protocols/control-plane-protocol
CREATE TABLE control_plane_protocol_1(
    id_ bigint UNIQUE,
    parent_id_ bigint,
    type varchar(100),
    name varchar(100),
```

TABLE 1-continued

```
    CONSTRAINT fk_control_plane_protocol_1 FOREIGN KEY
    (parent_id_)
REFERENCES root_ (id_) ON DELETE CASCADE,
    CONSTRAINT pk_control_plane_protocol_1 PRIMARY
    KEY(type,name,parent_id_)
);
```

The SQL DDL statements have a special field id_, which facilitates the forming of foreign key constraints. The names of the tables and fields in the CREATE TABLE statements may be similar to those in the ietf-interfaces.yang schema, but are not identical. A similarity of names simplifies ad-hoc SQL queries if one was to actually build a database for instances of the ietf-interfaces schema, but it is not required. All that is required is that the names be SQL-compliant and unique within their context. A translation table, discussed herein, allows for a mapping between original schema names and the names used in the SQL CREATE TABLE statements.

The methods for generating the SQL schema from the inlined tree-structured schema will not be discussed further.

Translation Table

The names of the fields in the inlined tree-structured schema, or in the SQL schema, will in general not map directly to the names of the nodes and fields in the original tree-structured schema. To complete a mapping between the tree-structured schema and the relational equivalent, there is a need of a translation table which will allow for a translation from an instance of the tree-structured schema and to an instance of the relational equivalent, and vice versa. Each table needed may include:

1. The name of its scalar subtree root
2. The name of the equivalent SQL table
3. The name of its parent, if any
4. The keys of the table, if any
5. For every field
    a. The path to the node containing the field
    b. The name of the field
    c. The name of the SQL field contain the tree-structured data field.

For example, the first two components of the translation table for the ietf-interfaces schema is shown in Table 2 and Table 3.

TABLE 2

| Node /, table root | | |
|---|---|---|
| field name | path | sql name |
| interface | routing-state/interfaces | interface |
| router-id | routing-state | routing_state_router_id |
| router-id | Routing | routing_router_id |

TABLE 3

| Node/routing/ribs/rib, table rib 1, child of/, key name | | |
|---|---|---|
| field name | path | sql name |
| address-family | Rib | address_family |
| name | Rib | name |
| description | Rib | description |

While this fragment of a translation table is designed for human readability, an actual translation table would be in a machine-readable format such as JSON, CSV, etc. This table would normally be generated when the tree-structured field is inlined, by keeping track of the fields in the scalar subtree. As such the generation of this table should be apparent to the practitioner who is skilled in the art, and we will not discuss this further.

Conversion Between Tree-Structured and Flat Data Instances

To convert an instance of a tree-structured schema into a set of records in a flat relational schema, one performs the following steps:

1. For each scalar subtree starting at the root and working downwards
   a. Populate a record corresponding to the scalar subtree using the translation table, and adding a foreign key dependence on its parent.
   b. Process each child scalar subtree of the current scalar subtree.

The details of this process will not be elaborated further.

To convert from a set of records in a flat relational schema to a tree-structured data instance, the following steps are performed:

1. For each scalar subtree starting at the root and working down,
   a. Fetch the relevant record
   b. For each non-NULL field, ensure that the indicated path exists and set its value to the value in the record.
   c. For each subtable which has records which link to the current record
      i. Process the record in the child subtree.

The details of this process will not be elaborated further.

Schema Modification Operations for Tree-Structured Data

Many of these operations build on the BiDEL SMOs described herein. The details of the transformation are well covered in prior presentation of BiDel and other bidirectional SMOs.

The process of translating a data instance of a tree structured schema from version V to V+1 or V−1 starts by creating a set of inlined records in the equivalent relational schema. These records can be stored and retrieved from a relational database, if the intention is to have a relational database of the tree-structured data. The transformations from semi-structured to relational schemas are understood.

But in many applications, it is only the data attached to an API which is being transformed. However, the methods described in the relational bidirectional SMO literature can still be applied. A tree-structured data instance will be converted into a collection of records of the equivalent relational tables. These in turn can be inserted into a conventional relational database management system (DBMS), such as Oracle, Postgres, MySQL, etc., and processed there.

However, many alternatives are possible. A lightweight in-memory database such as SQLite can be used instead. The records can be processed by code generated from SQL statements by a system, such as dbtoaster. Or special purpose data structures and data transformations can be developed to implement the SMO transforms.

Some modern DBMSs are document stores, such as Mongodb or Cassandra. Document stores can contain semi-structured records, such as tree-structured data. In this case the methods described in this disclosure can be used for bi-directional versioning of document store contents.

Two types of tree-structured bi-directional SMOs are presented: 1) map to a relational bidirectional SMO, and 2) do not map to a relational bidirectional. For the mappable SMOs, there is no detail the operation of the relational SMOs which might be involved, as their operation is well covered in other literature. For the non-mappable SMOs, details of the implementation are disclosed herein.

The input to the tree-structured bi-directional SMO procedure are a tree-structured complex schema, and the SMO used to convert it to an adjacent version. Both complex schemas (versions V and V+1) are in fact tree-structured are assumed below. Subsequently, both schemas have been converted into an inlined representation as discussed.

Since names of flat fields and tables can change between versions, standard names may be used, which are the names of the relevant tables and fields in the underlying flat representation. In addition, the standard names can help to identify the field maps.

Building on the material presented herein, the following are assumed to be available for each schema version. For example, for each scalar subtree:

1. A detailed description of its relational representation, equivalent to what was shown for SQL representation. This description includes the standard name of the tables and fields.
2. An entry in the table map table containing
   a. The parent of the scalar subtree, if any.
   b. The path to the scalar subtree. This can be full path (the path from the root) or a relative path (the path from its parent scalar subtree root).
3. A table (field_map) containing for each field
   a. The field name in the complex schema
   b. The (relative or full) path to the field
   c. The mapping to the standard name of the field.

It is convenient to have the children of each scalar subtree, but this information can be constructed from the description above. Similarly, full paths can be constructed from relative paths and vice versa.

Mappable SMOs

Figure 5:
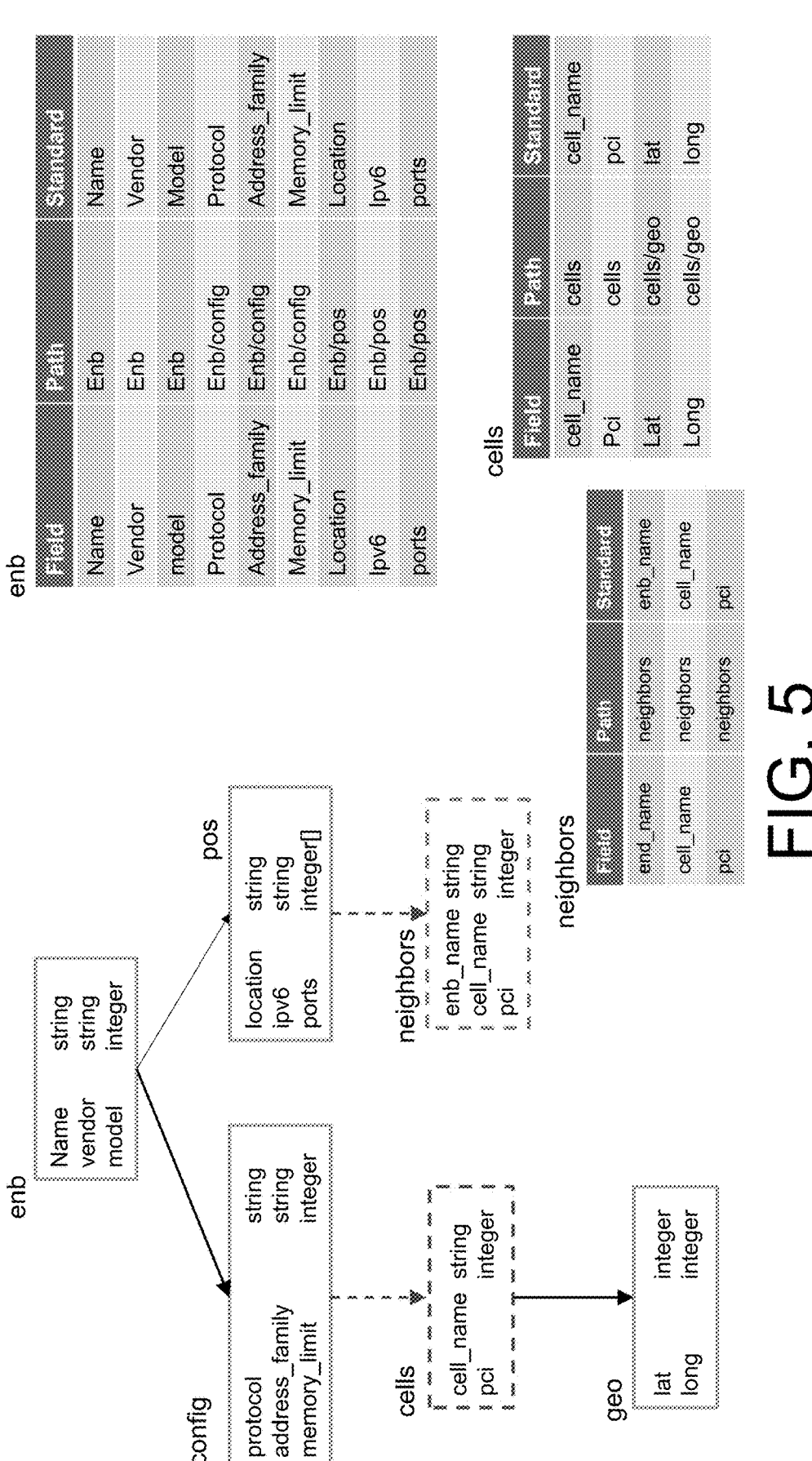
FIG. 5 illustrates example tree-structured schema and its field_map tables, version 1.

In this section, mappable bi-directional tree-structured SMOs is described. A running example will be used as shown in FIG. 5. The tree-structured schema is rooted at node enb, and has three scalar subtrees rooted at enb, enb/config/cells, and enb/pos/neighbors respectively. On the right are the field_map tables. Table 4 shows an exemplary table map for version 1.

TABLE 4

| Root | Path | Parent | Standard |
|------|------|--------|----------|
| enb | enb | | enb |
| cells | enb/config/cells | enb | cells |
| neighbors | enb/pos/neighbors | enb | neighbors |

Note that some operations might affect constraints defined by the tree-structured schema. For example, changing the name of a field, which may be significant, or has some other constraint. These details are assumed to be properly handled by the change in schema, and there is a focus on bidirectional data translation.

Change Field Name

This operation refers to changing the name of a field in a node, give the path to the node, the old field name, and the new field name "Change_field_name(path, old, new)".

This change is accomplished by modifying the field_map for the corresponding table, specifically:

1. Set the table map and the field maps of the version V+1 schema to be that of the version V schema.

2. Using the path, look up the Standard name of the field_map table for version V+1.

3. In the corresponding field_map table, look up the entry with old as the value of Field and with the corresponding Path for version V+1.

4. Change the value of the Field field from old to new for version V+1

Figure 6:
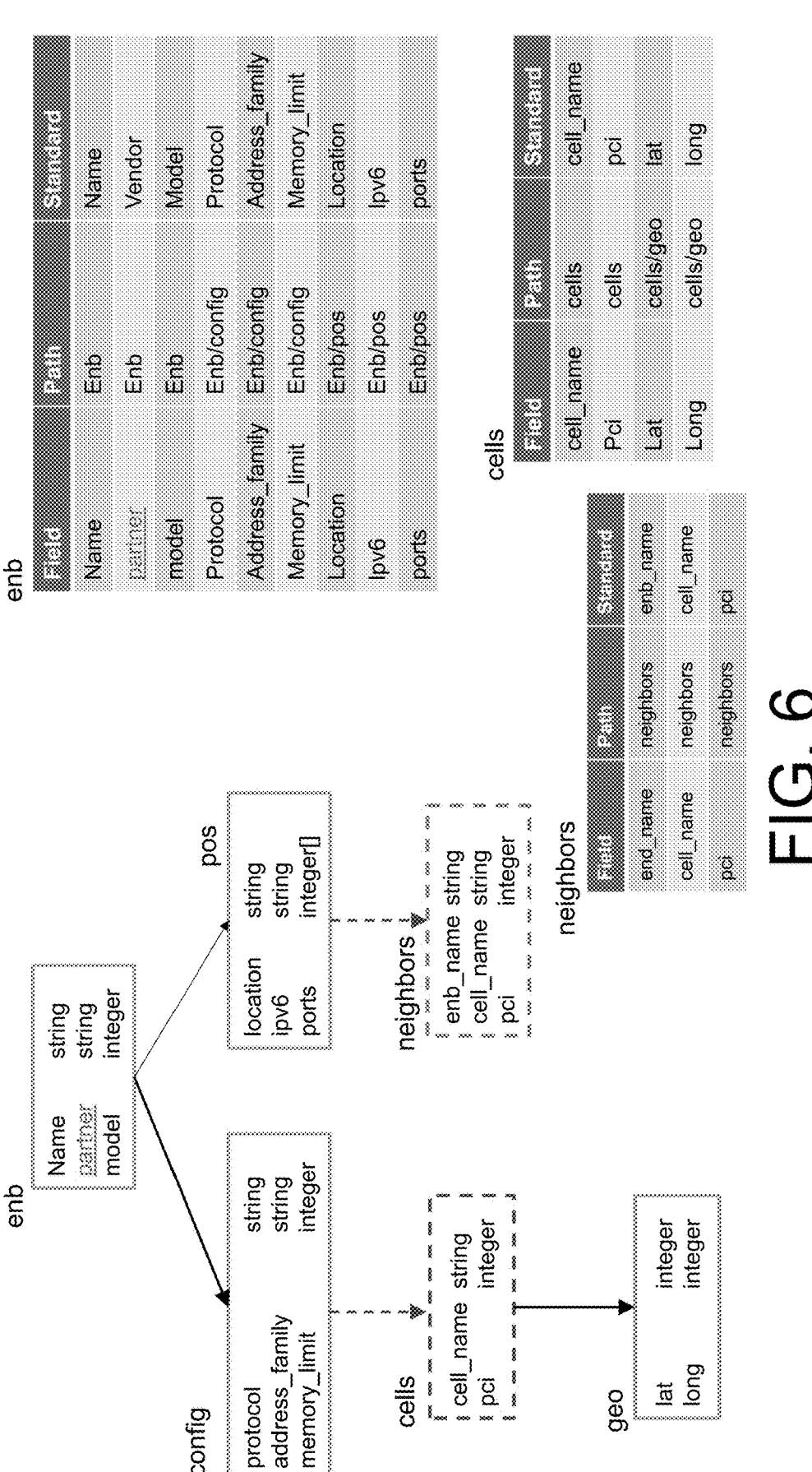
FIG. 6 illustrates version 2 of the schema after executing Change_field_name.

For example, FIG. 6 shows the schema and the table maps after executing Change_field_name(enb, vendor, partner), with the change underlined.

If a version V instance of the sample schema arrives, it can be readily converted into a version V+1 instance of the sample schema by converting the version V complex record into its flat representation using the version V table map and field_map tables, then converting into a version V+1 instance of the sample schema by using the version V+1 table map and field_map tables. Similarly, a record from version V can be stored in a relational database and readily retrieved as a version V+1 record, and vice versa.

Move Field Internally

This operation refers to moving a field from one node to another, where both nodes are in the same scalar subtree.

Move_field_internal(field_name, old_path, new_path)

This change is accomplished by modifying the field_map for the corresponding table, specifically 1. Set the table map and the field maps of the version V+1 schema to be that of the version V schema.

2. Using the path, look up the Standard name of the field_map table for version V+1.

3. In the corresponding field_map table, look up the entry with field_name as the value of Field and with the old_path as the value of Path for version V+1.

4. Change the value of the Path field from old_path to new_path for version V+1

Figure 7:
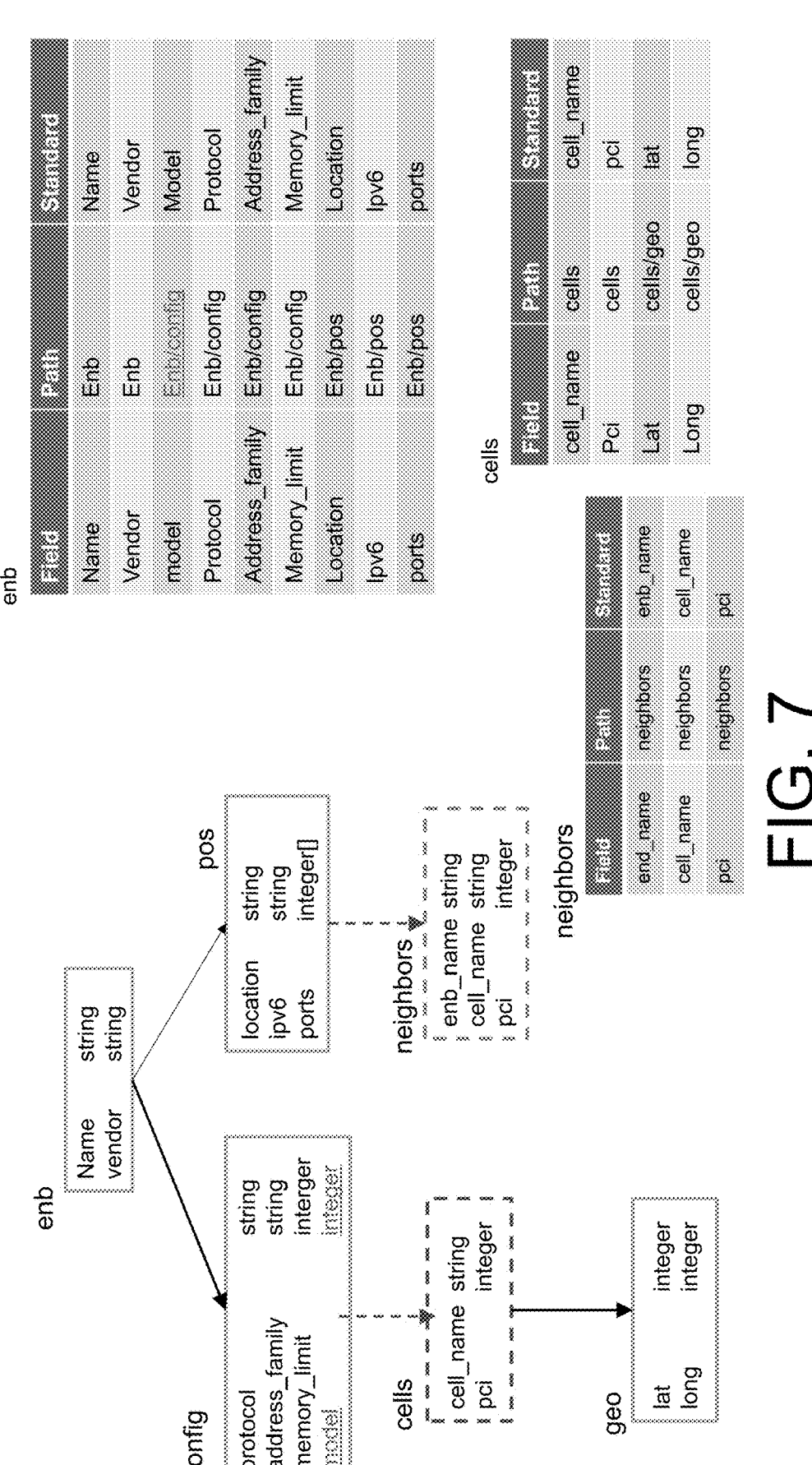
FIG. 7 illustrates version 2 of the schema after applying Move_field_internal.

For example, FIG. 7 shows the schema and the table maps after executing Move_field_internal(model, enb, enb/config), with the change underlined.

Change Node Name

This operation refers to changing the name of a node, given the path to that node.

Change_node_name(path, new)

This change is accomplished by modifying the table map and the field map for the corresponding table, specifically 1. Set the table map and the field maps of the version V+1 schema to be that of the version V schema.

2. Using the path, look up the Standard name of the field_map table for version V+1.

3. In the table map,
   a. For every entry whose value of the Path field is a suffix of path,
      i. Change the name of the node in the Path field to new.

4. In the corresponding field map, for every entry
   a. If the Path field contains path, change the value of the node to new.
   b. If the path corresponds to the root of a scalar subtree
      i. Change the value of Root for the scalar subtree's entry.
      ii. Update the value of Parent for any subtrees affected by the name change.

Figure 8:
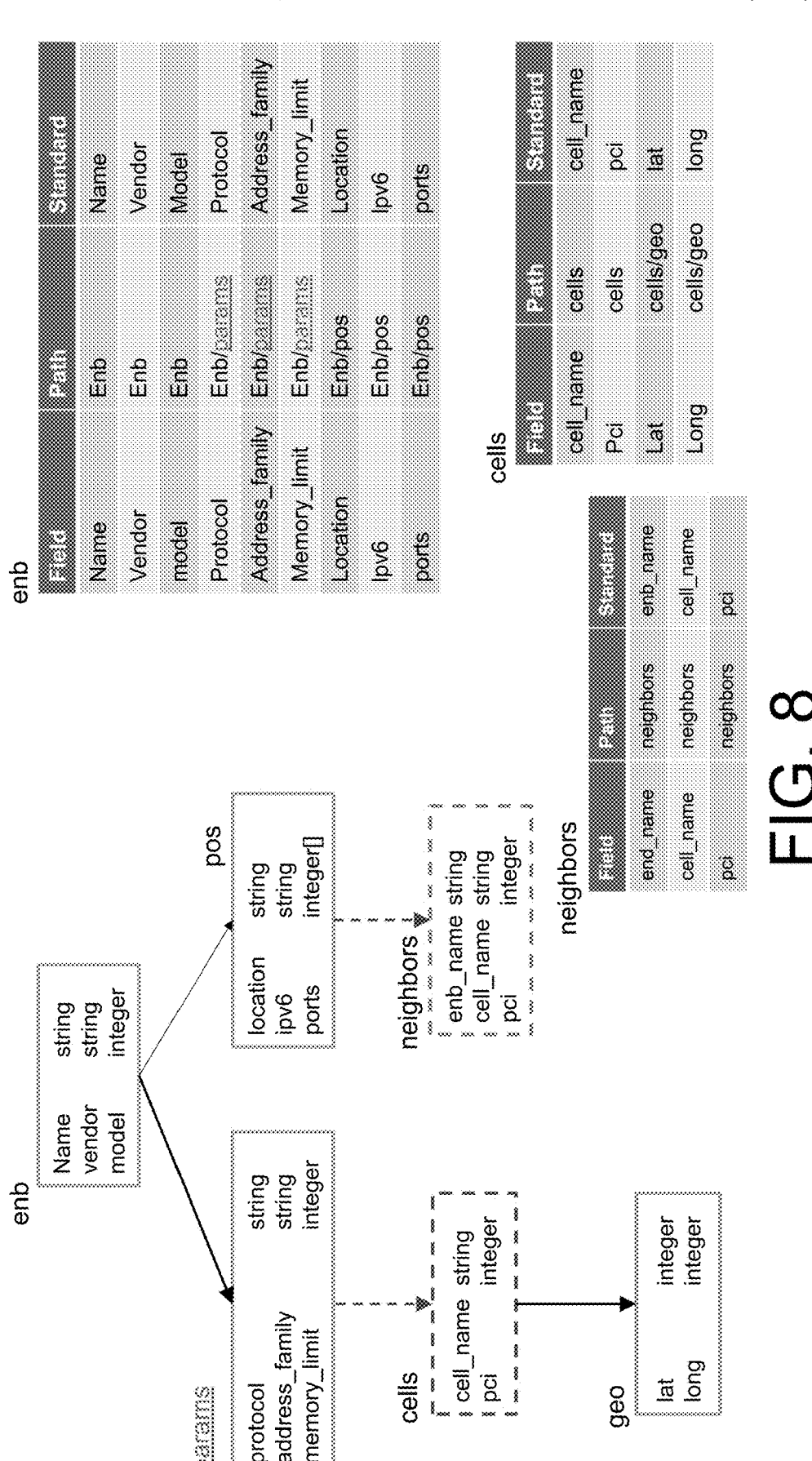
FIG. 8 illustrates version 2 of the schema after applying change_node_name.

For example, FIG. 8 shows the schema and the table maps after executing Change_node_name(enb/config, params), with the change underlined. Table 5 shows the updated table map after applying the change.

TABLE 5

| Root | Path | Parent | Standard |
|------|------|--------|----------|
| enb | enb | | enb |
| cells | enb/params/cells | enb | cells |
| neighbors | enb/pos/neighbors | enb | neighbors |

Move a Node Internally

This operation refers to moving the path to a node, but staying in the same scalar subtree. List nodes can be moved within the scalar subtree. The entire subtree rooted at the old_path moves to new_path.

Move_node(old_path, new_path)

This change is accomplished by modifying the table map and the field map for the corresponding table, specifically 1. Set the table map and the field maps of the version V+1 schema to be that of the version V schema.

2. Using the path, look up the Standard name of the field_map table for version V+1.

3. In the table map,
   a. For every entry whose value of the Path field is a prefix of old_path,
      i. Change that prefix in the Path field to new_path.

4. In the corresponding field map, for every entry
   a. If the Path field contains old_path as a prefix, change that prefix to new_path.

For example, FIG. 9 shows the schema and the table maps after applying Move_node(enb/pos, enb/config/pos), with the change underlined and short dashes. Table 6 shows version 2 table map.

TABLE 6

| Root | Path | Parent | Standard |
|------|------|--------|----------|
| enb | enb | | enb |
| cells | enb/config/cells | enb | cells |
| neighbors | enb/config/pos/neighbors | enb | neighbors |

It should be clear that a scalar subtree can be arbitrarily rearranged by applying a sequence of one or more Move_node operations.

Add Field

This operation refers to adding a field to a node, and is specified by

Add_field(path, field_name)

This change is accomplished by modifying the table map and the field map for the corresponding table, specifically 1. Set the table map and the field_maps of the version V+1 schema to be that of the version V schema.

2. Using the path, look up the Standard name of the field_map table for version V+1.

3. Add a field with path path and name field_name to the field_map table. Use a standard name which does not already exist in any version of this field_map table.

4. Use the "Add column" relational SMO (entry 5, of BiDEL SMO) to adjust the underlying flat schema.

Figure 10:
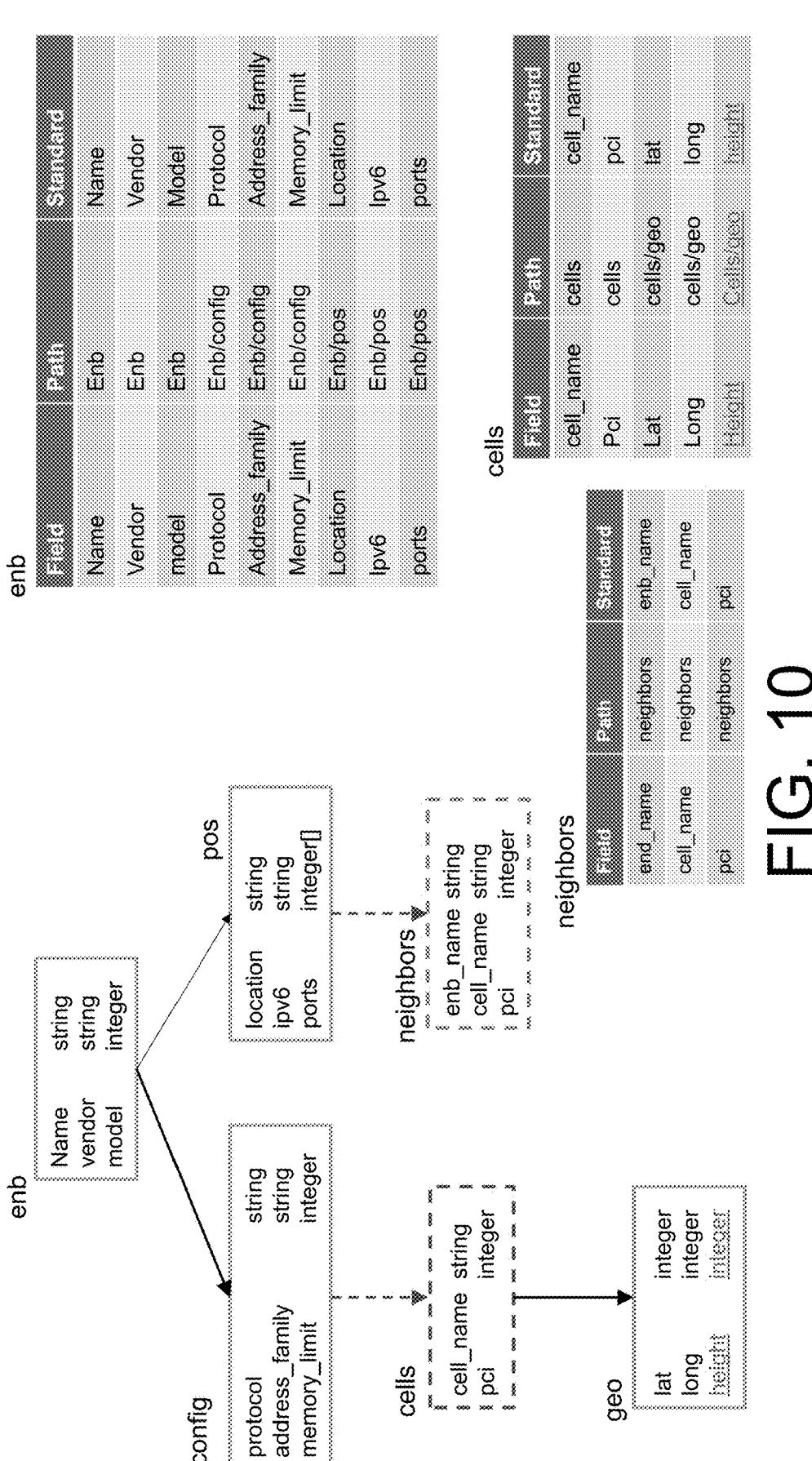
FIG. 10 illustrates version 2 schema and field maps after applying Add_field.

For example, FIG. 10 shows the schema and table maps after applying Add_field(enb/config/cells/geo, height). The changes are underlined.

Unlike previously discussed complex schema modification operations, this one involves a change in the underlying relational schema. There is a reliance on the relational bidirectional SMOs to ensure bidirectional data modifications in the flat relational schema, which then transfer to bidirectional data modifications in the complex schema. While there is a reliance on the previous literature for the details, in general an instance of the version 1 schema has some kind of default value supplied for the enb/config/cells/geo/height field of the version 2 schema.

Delete Field

This operation refers to removing a field from a node, and is specified by

Delete_field(path, field_name)

This change is accomplished by modifying the table map and the field map for the corresponding table, specifically 1. Set the table map and the field maps of the version V+1 schema to be that of the version V schema.
2. Using the path, look up the Standard name of the field_map table for version V+1.
3. Remove a field with path path and name field_name from the field_map table.
4. Use the "Drop column" relational SMO (entry 3, BiDEL SMOs) to adjust the underlying flat schema.

Figure 11:
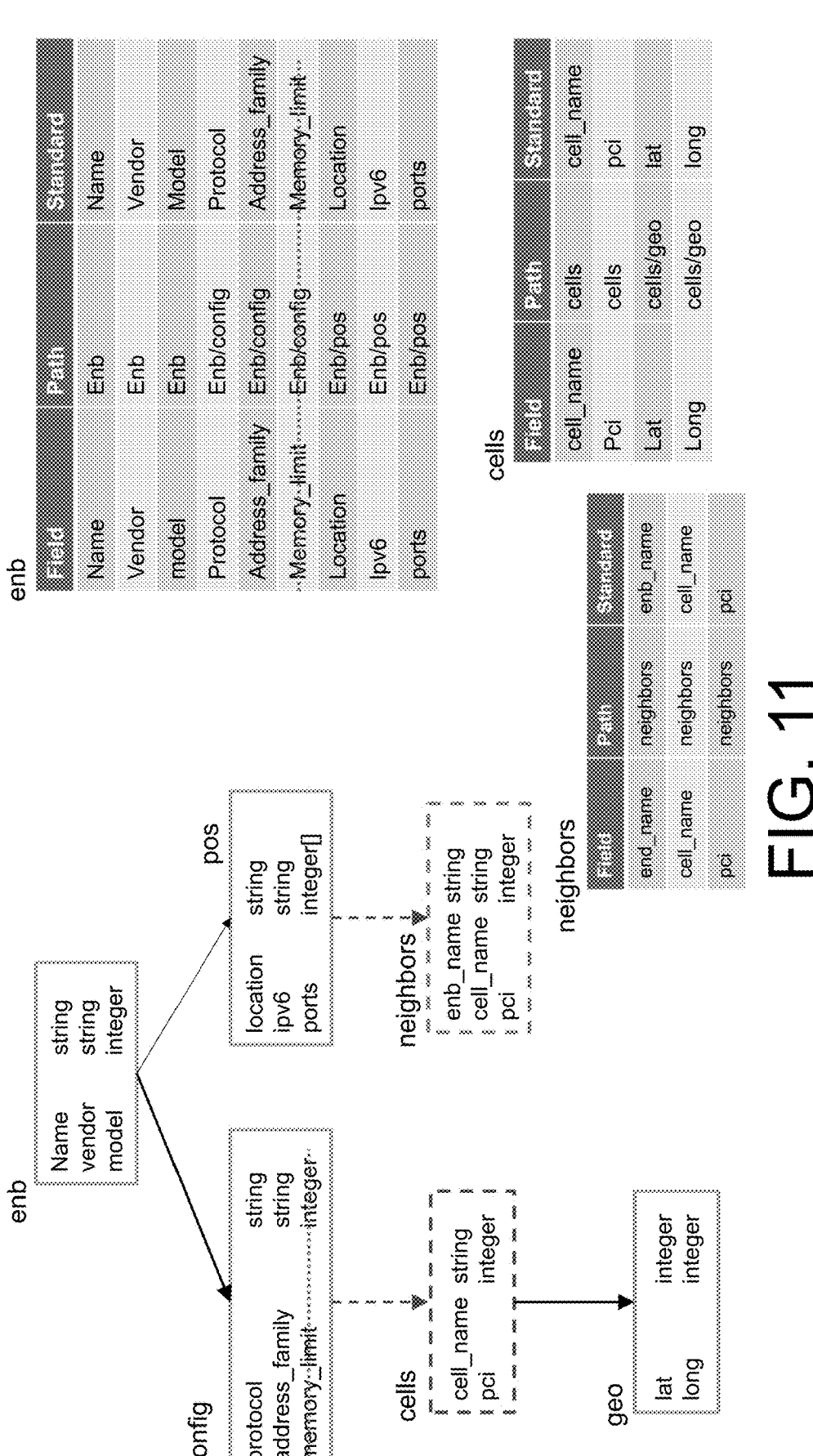
FIG. 11 illustrates version 2 of the schema after applying the Drop_field operation.

For example, FIG. 11 shows the schema and field_map tables after applying the Drop_field(enb/config, memory_limit) operation. The deleted elements are struck out with a short-dashed bar.

Add Node

This operation refers to adding a node to the tree, as a leaf. A single field must be supplied for the node. The node can be a list node.

Add_node(path, node, field)

There are cases, depending on whether or not the node is a list node. First consider the case in which the node is not a list node.

This change is accomplished by modifying the table map and the field map for the corresponding table, specifically 1. Set the table map and the field maps of the version V+1 schema to be that of the version V schema.
2. Using the path, determine the standard name of the field map.
3. In the corresponding field map, add an entry with the new field and the appropriate path
4. Use the "Add column" relational SMO (entry [0007], BiDEL SMOs) to adjust the underlying flat schema.

Figure 12:
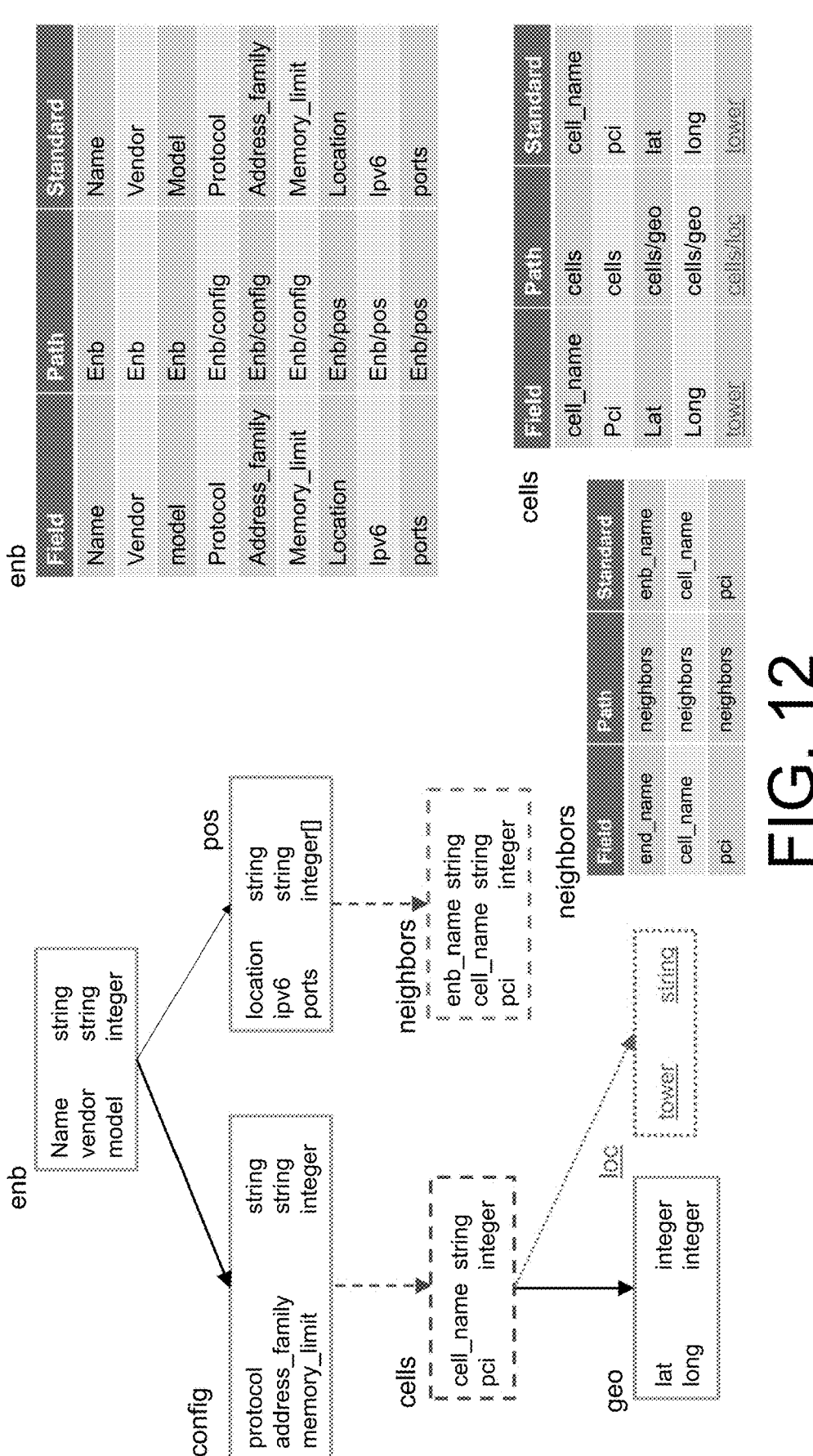
FIG. 12 illustrates adding a non-list node.

For example, FIG. 12 shows the schema and the table maps after applying add_node(/enb/config/cells, pos, tower), with the change underlined or short-dashed outline.

In the case that the node is a list node, the change is accomplished by:

1. Set the table map and the field maps of the version V+1 schema to be that of the version V schema.
2. Add a record to the table map, with the node as the root, the path set to the appropriate path (full or relative), a unique standard name, which can be the name of the node if possible, and a parent as determined by the lowest list node on the path to the inserted node, if any.
3. Create a table map for the newly inserted list node, and configure it to contain an entry for the new field.
4. Use the "create table" relational SMO (entry 1, BiDEL SMOs) to adjust the underlying flat schema.

Figure 13:
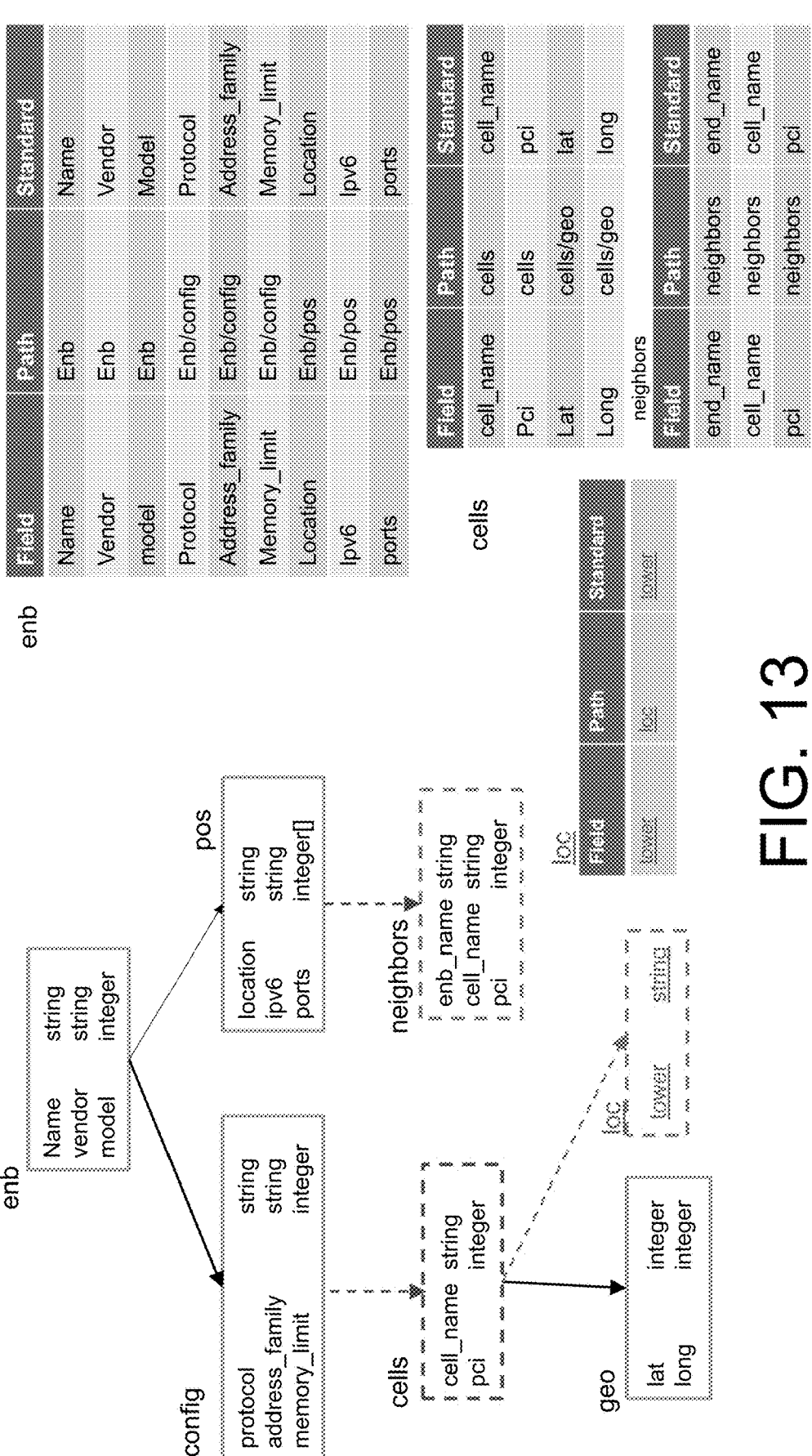
FIG. 13 illustrates adding a list node.

For example, FIG. 13 add_node(/enb/config/cells, pos, tower), with the change underlined. Table 7 shows the updated table map after adding a list node.

TABLE 7

| Root | Path | Parent | Standard |
|------|------|--------|----------|
| enb | enb | | enb |
| cells | enb/config/cells | enb | cells |
| neighbors | enb/pos/neighbors | enb | neighbors |

Delete Node

Define an operator in which only a leaf node can be deleted. If the target node has children, they must first be deleted or moved away. In this case, a non-list node can be effectively deleted by deleting all of its fields. So, for this operator, only list nodes can be deleted.

Delete_node(path)

This change may be accomplished by

1. Set the table map and the field maps of the version V+1 schema to be that of the version V schema.
2. Using the path, determine the standard name of the field map.
3. Delete the field map
4. Delete the entry in the table map for the deleted node.
5. Use the "drop table" relational SMO (entry 2, BiDEL SMOs) to adjust the underlying flat schema.

For example, suppose that the neighbors list node is deleted from the schema depicted in Table 4.

Delete_node(/enb/pos/neighbors)

Afterwards, the table map after deleting the neighbors list node becomes as shown in Table 8.

TABLE 8

| Root | Path | Parent | Standard |
|------|------|--------|----------|
| enb | enb | | enb |
| cells | enb/config/cells | enb | cells |

Split Node

Splitting a node only applies to list nodes, and divides the list among two different list nodes. In view of other works, there is an independent criterion for inclusion of a member of a list into each of the new nodes. The splitting of the list into the two nodes does not necessarily need to be a partition.

Split_node(path, new_node1, criteria1, new_node2, criteria2)

When a list node is split, the subtrees under it are duplicated in both new nodes. These subtrees may include list nodes in turn, which will also need to be split. The procedure for splitting a list node is 1. Set the table map and the field maps of the version V+1 schema to be that of the version V schema.
2. Using the path, determine the standard name of the field map.
3. Create two new entries for the table map for new_node1 and new_node2, which are copies of the table map entry for the node being split.
   a. Update the path field for the new nodes, and choose standard names which are unique among standard names, but preferably the new node names if possible.
   b. Delete the table map entry for the node being split.
4. Create two new field maps for new_node1 and new_node2 respectively, which are copies of the field maps for the node which is being split.
   a. Update the path fields in these field maps appropriately
   b. Delete the field map of the node being split.
5. Use the "Split table" SMO (entry 9 of BiDEL SMOs) to adjust the underlying flat schema.
6. For every list node in the scalar subtree of the node which was split, recursively split the list node with the criteria for splitting being the parent residing in new_node1, new_node2, both, or neither.

For example, suppose that the cells list node is split in the schema depicted in FIG. 13.

Split_node(/enb/config/cells, cells_1, <criteria 1>, cells_2, <criteria 2>)

Figure 14:
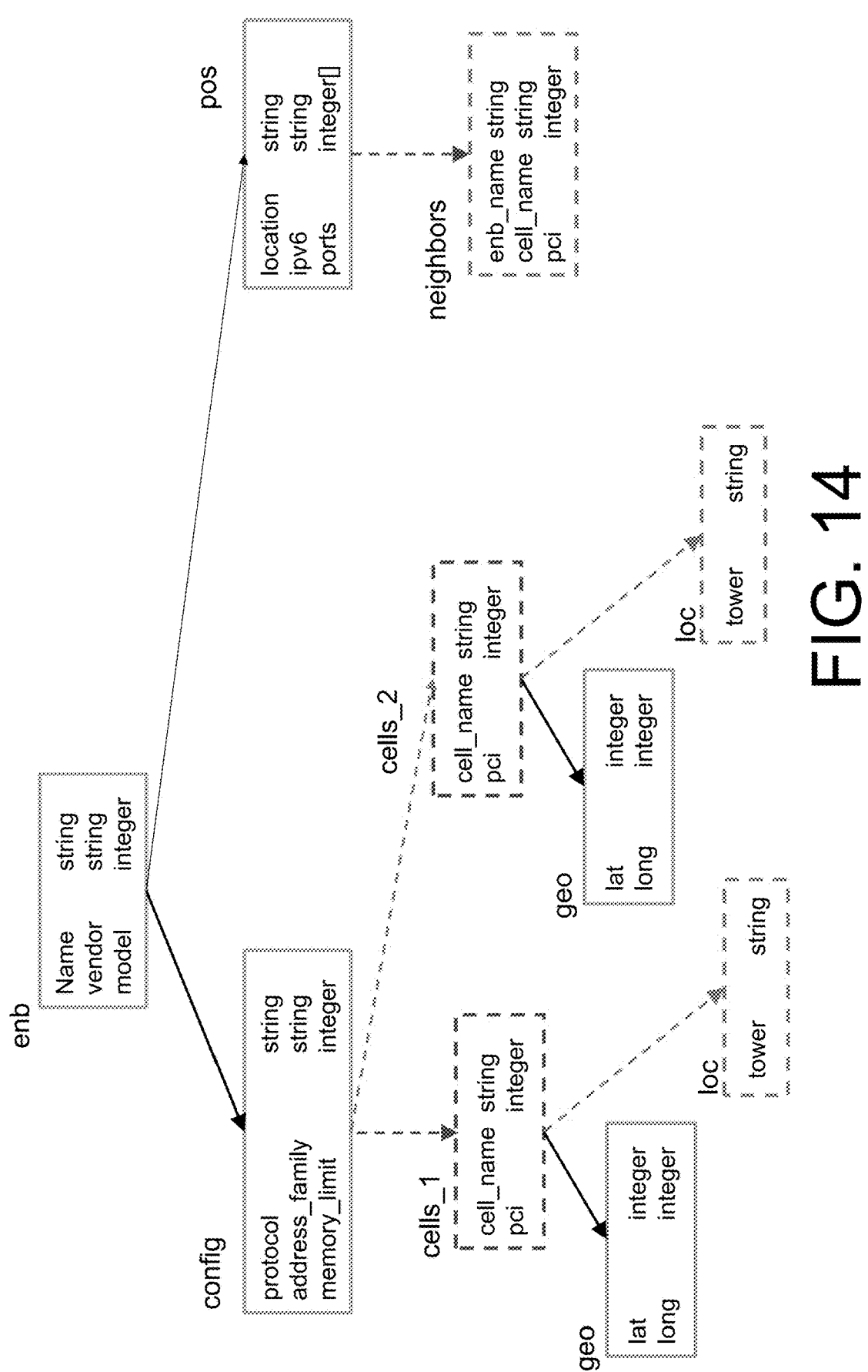
FIG. 14 illustrates splitting the cells node.

Then the resulting schema is as shown in FIG. 14. Splitting cells means that the geo node must also be split up among cells_1 and cells_2. Since the contents of the table which contains cells also contains the contents of geo, cells_1 (cells_2) contains the contents of geo after applying the "split table" SMO. The loc list node must also be recursively split, resulting in a loc list node in each subtree. The resulting table map is shown in FIG. 1. Note that the new loc list nodes need unique standard names, here we have chosen loc_1 and loc_2. Table 9 shows table map after split_cells.

TABLE 9

| Root | Path | Parent | Standard |
|------|------|--------|----------|
| enb | enb | | enb |
| cells_1 | enb/config/cells_1 | enb | cells_1 |
| cells_2 | Enb/confis/cells_2 | enb | cells_2 |
| neighbors | enb/pos/neighbors | enb | neighbors |
| loc | enb/config/cells_1/loc | cells_1 | loc_1 |
| loc | enb/config/cells_2/loc | cells_2 | loc_2 |

FIG. 1. Table map after split_cells.

Merge Nodes

The merge node operation is the opposite of the split node operation. Two list nodes rooted at the same parent can be merged into a single list node, on the condition that they have the same tree structured subschema. If there has been some schema drift since the split operation, the subschemas can be brought into alignment by node and field addition, deletion, moving, and renaming operations.

Merge_nodes(path1, path2, new_node)

As with the split node operation, the merge node operation also applies recursively to any list nodes in the scalar subtrees of the nodes being merged. The procedure for merging two list nodes is 1. Set the table map and the field maps of the version V+1 schema to be that of the version V schema.
2. Using the paths, determine the standard name of the field maps.
3. Create a new entry in the table map for the new node, which is a copy of the entries of the nodes being merged.
   a. Update the path field for the new node, and choose a standard name which is unique.
   b. Delete the table map entries for the merged nodes.
4. Create a field map which is a copy of the field maps of the merged nodes.
   a. Update the path entry for the new field map
   b. Delete the field maps of the merged nodes.
5. Apply the "merge table" SMO (entry 10 of BiDEL SMOs) to the underlying flat schema.
6. For every list node in the scaler subtrees of the merged nodes, recursively merge these nodes.

Figure 15:
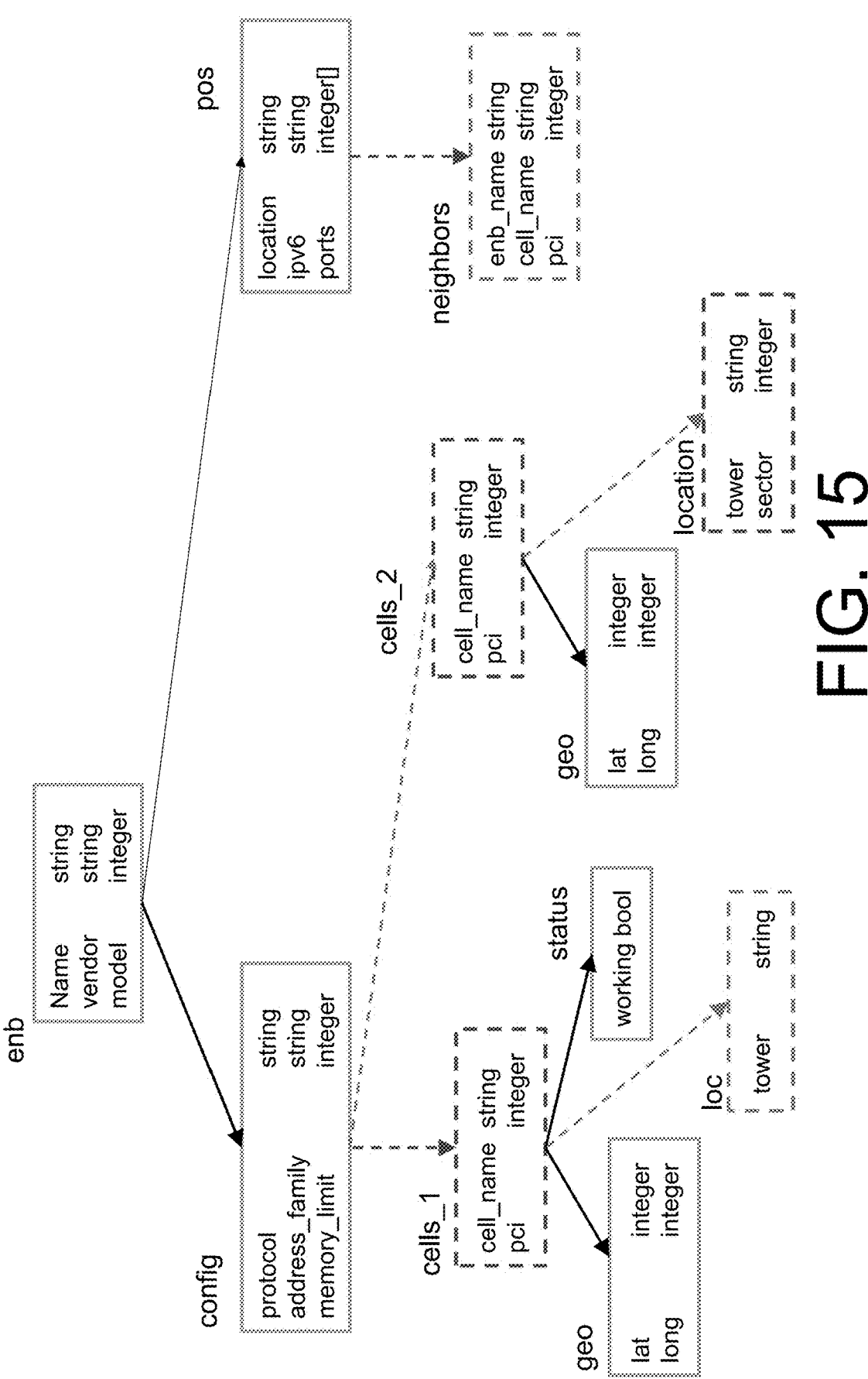
FIG. 15 illustrates schema after drift.

For an example, suppose that the schema depicted in FIG. 14 has evolved into the schema depicted in FIG. 15.

Figure 16:
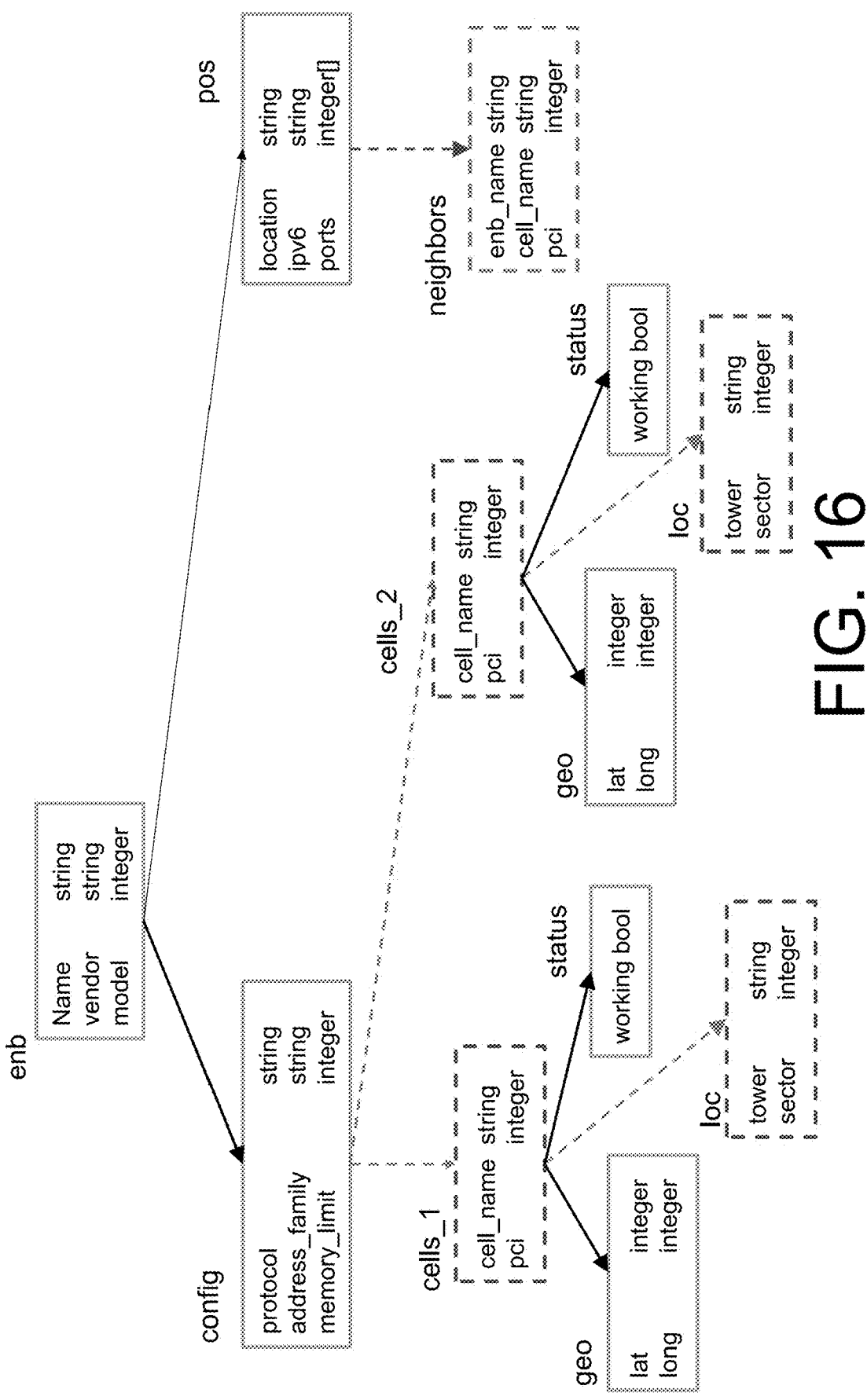
FIG. 16 illustrates synchronized subschemas.

Before executing Merge_nodes(enb/config/cells_1, enb/config/cells_2, cells), the cells_1 and cells_2 subschemas must be brought into synch via previously discussed operations. One possible result is depicted in FIG. 16.

Figure 17:
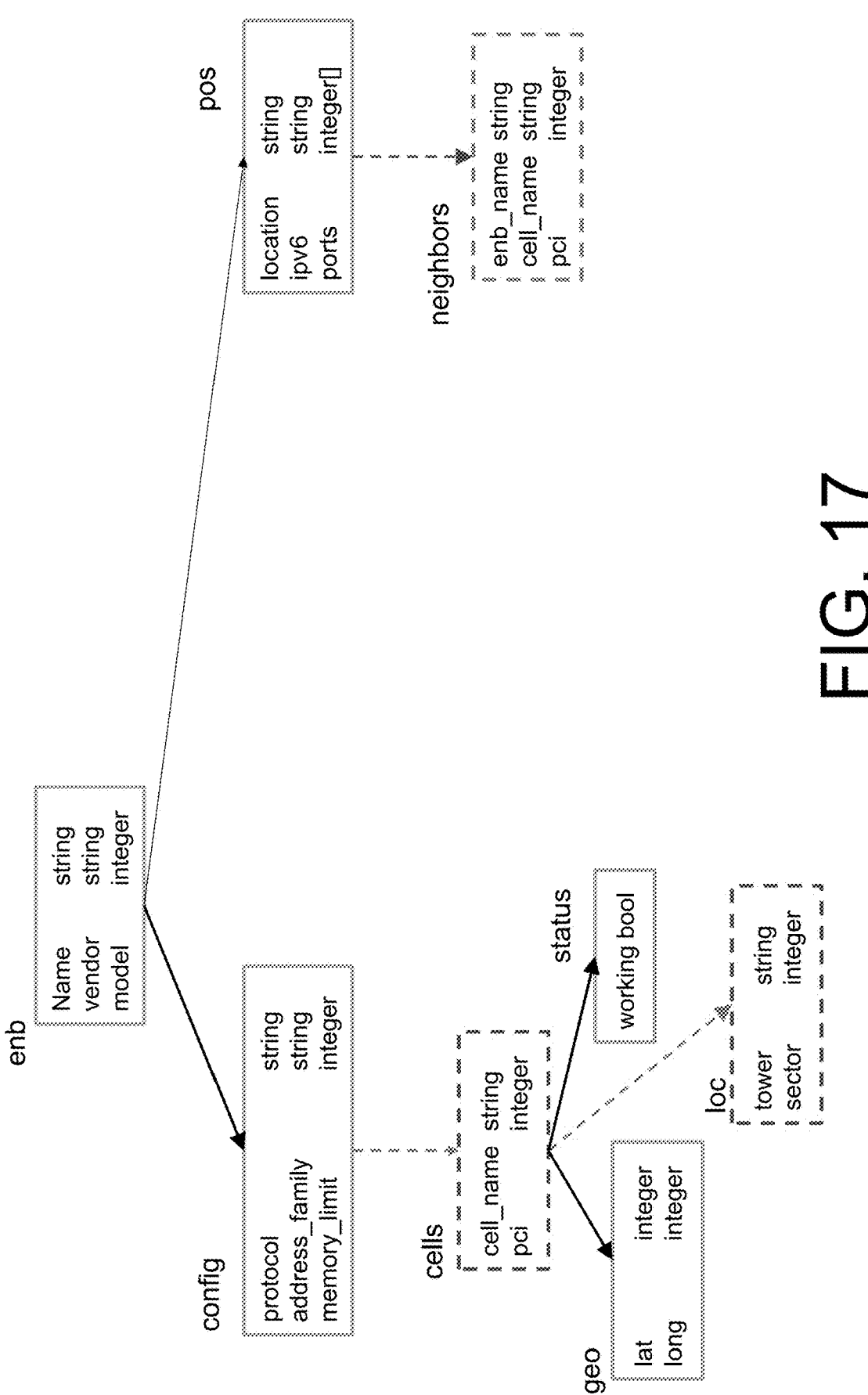
FIG. 17 illustrates merged schema.

Then, merging cells_1 and cells_2 into cells results in the schema shown in FIG. 17.

The new table map is shown in Table 10. While the table map has mostly reverted to that of Table 7, the standard names for cells and loc should be made unique to avoid confusion with any pre-existing flat relational tables and existing field maps.

TABLE 10

| Root | Path | Parent | Standard |
|------|------|--------|----------|
| enb | enb | | enb |
| cells | enb/config/cells | enb | cells_3 |
| neighbors | enb/pos/neighbors | enb | neighbors |
| loc | enb/config/cells/loc | cells | loc_3 |

Decompose Node

The decompose node operation breaks a list node into two different nodes with different schemas. One or more of the fields in the decomposed list node must be key fields, and must be present in both list nodes after decomposition. The children of the list node are split among the two decomposed nodes.

Decompose_node(path, new_node1, new_node2, fields1, fields2, subtrees1, subtrees2)

The procedure for decomposing a node is

1. Set the table map and the field maps of the version V+1 schema to be that of the version V schema.
2. Using the path, determine the standard name of the field map.
3. Create two new entries for new_node1 and new_node2 in the table map, modifying the path of the decomposed node by replacing its name with new_node1 (new_node2) and using unique names for the standard name, but preferably new_node1 (new_node2).
4. Create two new field maps, apportioning the fields between the two new nodes and adjusting the path field to reflect the change in node name.
5. Delete the old field map and the old entry in the table map.
6. Use the "split table" SMO (entry 9 of BiDEL SMOs) to the underlying flat schema.

Figure 18:
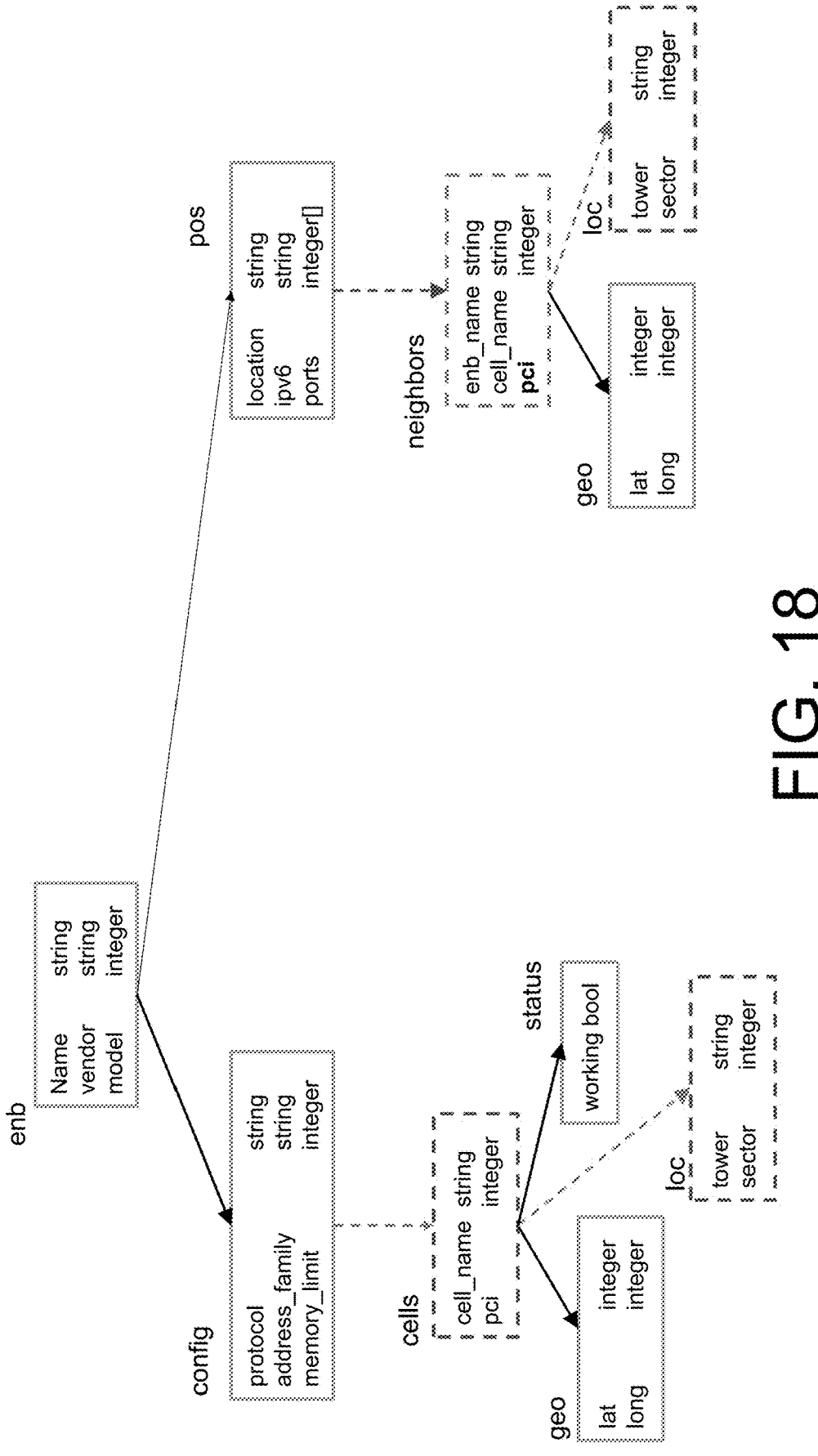
FIG. 18 illustrates before the decompose operation.
Figure 19:
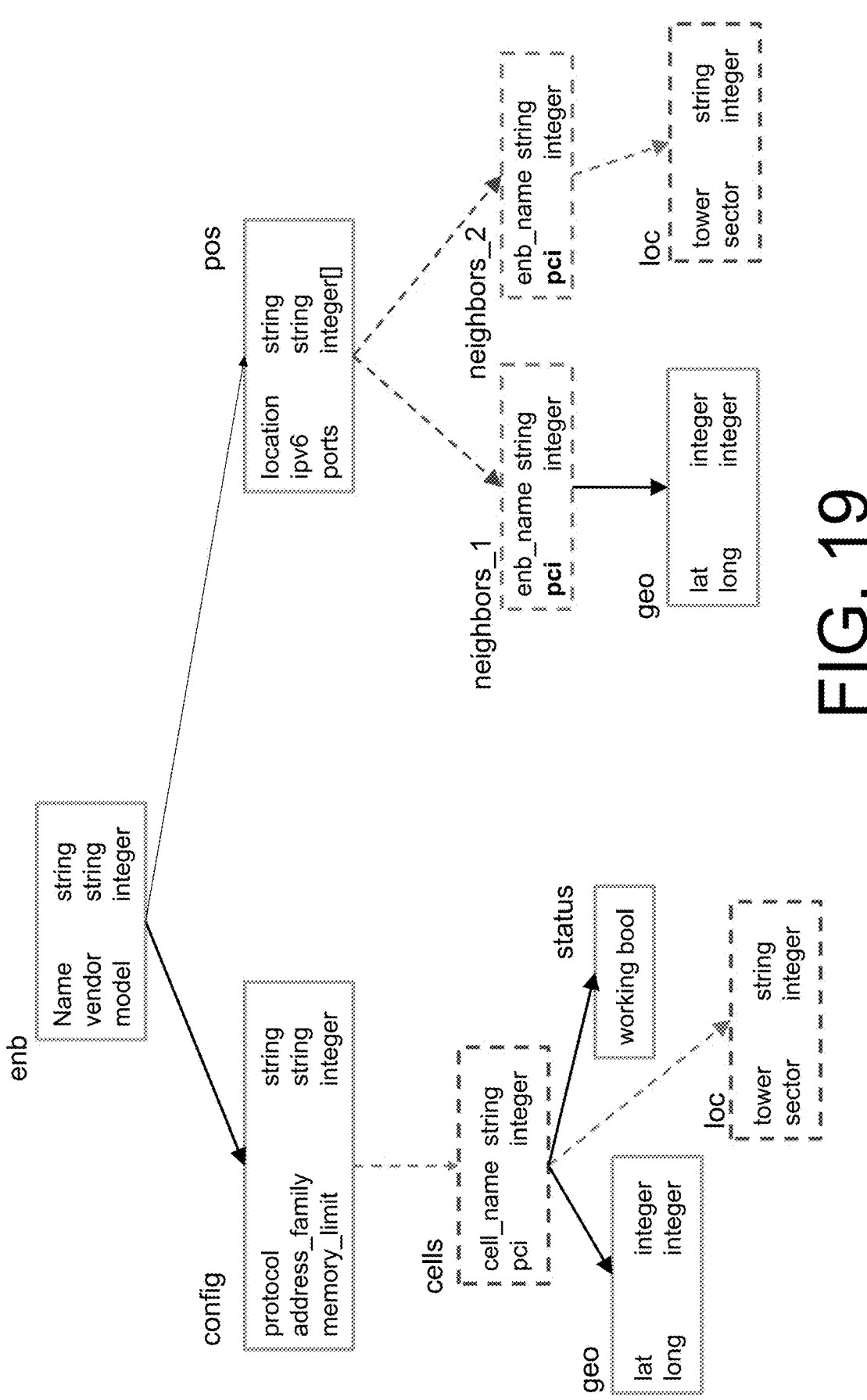
FIG. 19 illustrates after the decompose operation.

For an example, consider the tree structured schema shown in FIG. 18. Let us assume that the tree structured schema indicates that pci is a key of/enb/pos/neighbors (shown in bold). If the operation "Decompose_node(/enb/pos/neighbors, neighbors_1, neighbors_2, [cell_name, pci], [enb_name, pci], [geo], [status])" is applied. The result is shown in FIG. 19 is the result.

Table 11 shows the table map before the decompose operation, and Table 12 shows the table map after the decompose operation, with the changes and new additions underlined.

TABLE 11

| Root | Path | Parent | Standard |
|------|------|--------|----------|
| enb | enb | | enb |
| cells | enb/config/cells | enb | cells |
| neighbors | enb/pos/neighbors | enb | neighbors |
| loc | enb/config/cells/loc | cells | loc |
| loc | enb/pos/neighbors/loc | neighbors | loc_2 |

TABLE 12

| Root | Path | Parent | Standard |
|---|---|---|---|
| enb | enb | | enb |
| cells | enb/config/cells | enb | cells |
| neighbors_1 | enb/pos/neighbors_1 | enb | neighbors_1 |
| neighbors_2 | enb/pos/neighbors_2 | enb | neighbors_2 |
| loc | enb/config/cells/loc | cells | loc |
| loc | enb/pos/neighbors_2/loc | neighbors_2 | loc_2 |

Before the decompose operation, the field map for the neighbors table is shown in Table 13. After the decompose operation, the field map of neighbors1 is shown in Table 14, and the field map of neighbors_2 is shown in Table 15.

TABLE 13

| Field | Path | Standard |
|---|---|---|
| enb_name | neighbors | enb_name |
| cell_name | neighbors | cell_name |
| pci | neighbors | pci |
| lat | neighbors/geo | lat |
| long | neighbors/geo | long |

TABLE 14

| Field | Path | Standard |
|---|---|---|
| cell_name | neighbors_1 | cell_name |
| pci | neighbors_1 | pci |
| lat | neighbors_1/geo | lat |
| long | neighbors_1/geo | long |

TABLE 15

| Field | Path | Standard |
|---|---|---|
| cell_name | neighbors_2 | enb_name |
| pci | neighbors_2 | pci |

Compose Operation

The compose operation combines two list nodes into a single list node with a combined schema. The two nodes being combined must both have keys, consisting of exactly the same fields. The composed node has the collection of subtrees of the two node which are being composed, and they must all have distinct names. The nodes being composed must have the same parent. The compose operation is the inverse of the decompose operation.

Compose_node(path1, path2, new_node)

The procedure for composing a node is

1. Set the table map and the field_maps of the version V+1 schema to be that of the version V schema.
2. Using the paths, determine the standard names of the field maps.
3. Create a new entry in the in the table map for new_node, modifying the path of one of the two composed nodes by replacing the name with new_node, and using a unique name for the standard name.
4. Create a new field map, merging the fields from the two composed field maps and adjusting the path fields accordingly.
5. Delete the old field maps and the old entries in the table map.

6. Use the "join table" SMO (entry 8 of BiDEL SMOs) to the underlying flat schema.

For example, suppose that the operation Compose node (enb/pos/neighbors_1, enb/pos/neighbors_2, neighbors) is applied to the tree-structured schema depicted in FIG. 19. Then the result is that shown in FIG. 18. The table map changes from that shown in Table 12 to that in Table 11. The field maps in Table 14 and in Table 15 merge to create the field map shown in Table 13.

Another Join Type Operation.

Suppose that in the cells node, a cell identified by a pci might have multiple names (see FIG. 20). Then cell_name can become a list node under cells, which now contains only the key, pci. Geo, loc, and status (along with any other non-key fields in cells) become children of the new list node name. So, this is possible and reversible but it leans pretty heavily on more traditional relational semantics.

That is, under normal interpretation, an entry in a list node has an implicit key, and all entries in the list of nodes are distinct regardless of their contents. So, moving cell_name to a child node does not collapse the collection of entries in the cells list node. To make this collapse, one must state that the pair (pci, cell_name) are a key before the transformation, and that pci is a key of cells and cell_name is a key of name afterwards. This kind of transformation requires multi-field keys, which are a feature of Yang, but not of other common semi-structured schema languages.

A reason to make this transformation depends on other traditional relational semantics—functional dependencies. A set of fields K functionally determines a field Vif whenever two records have the same value for the fields in K, they have the same value of V. So for example, within the subtree rooted at cells, the pair (pci, cell_name) functionally determines geo/lat. In a more relational phrasing using the schema design suggested herein, the triple (pci, cell_name, parent_id_) functionally determines lat.

Suppose a schema designer wishes to add the name of the cell maintainer to the schema. It might be the case that a single maintainer is responsible for all equipment with the same pci, regardless of the cell_name. That is, (pci) functionally determines maintainer. In that case, the schema designer might wish to perform the transformation shown in FIG. 20 in preparation for adding a maintainer field to cells (or a child node with the maintainer's contact information, etc.).

If one has these types of functional dependencies available, further bidirectional transformations are possible. For example, one might determine that (pci, cell_name) functionally determine both geo and loc, but that (pci) functionally determines status. In this case, status could remain a child of cells, while geo and loc become children of name.

Additional Operations

Additional operations can be defined, but they might not have guaranteed inverses. For example, a common schema change is to change the data type of a field, perhaps from integer to string, or from string to bytes. While invertible transforms can be defined, they are not currently in scope.

An example of an invertible transform is string <-> bytes. An (asci, Unicode, etc.) string can be stored in an uninterpreted bytes data type, and conversely the uninterpreted bytes can be stored as a string, e.g., using escape characters to represent nulls and other unrepresentable bytes.

Figure 21:
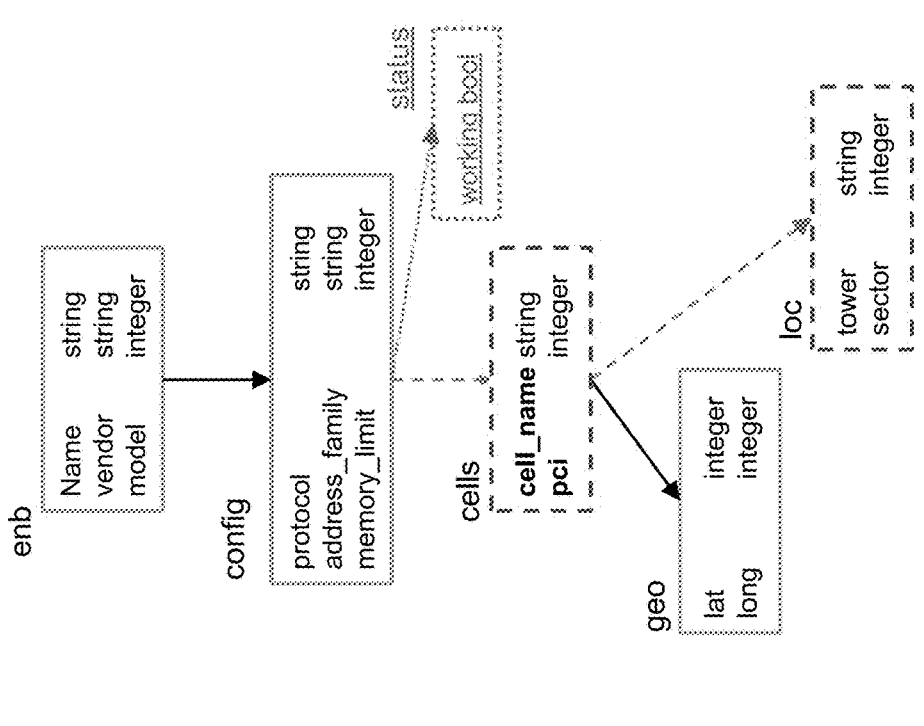
FIG. 21 illustrates moving a node outside of its scalar subtree.

Another transform moves a node or field outside of its scalar subtree. For example, in FIG. 21 the status node is moved above the cells node. The location of the status node determines its meaning. On the left, it's the status of the cell. On the right it's the status of the enodeb. If the right and left versions of the schema are supposed to mean the same thing, then moving this node is fixing a bug in the schema. So e.g. perhaps the status node is always supposed to represent the status of the enodeb and the transform is intended to improve clarity and eliminate a redundancy.

However, this interpretation seems to require detailed knowledge which is hard to capture in a generic schema transformation. That is, one needs to know that enb.id_ functionally determines all fields in status when the cells node is flattened into enb. This property could be checked in any collection of these records. However, a major motivation for this kind of schema change is to help avoid data quality problems, so any collection of such records might exhibit these problems.

Shortcut Operations

The operations described herein are simple in order to enable simple descriptions. For some applications it may be desirable to use larger operations. For example, there may be an addition of a node with all of its fields, and in the middle of a path, not as a leaf. Such operations are a collection of an add_node, several add_field, and one or more move_node operations. So, the details of such a shortcut operation is fully described by the operations described herein.

API systems, such as Swagger, Netconf, or Protocol Buffers, use semi-structured schema languages (JSON Schema, Yang, and Protocol Buffers, respectively) to describe data interactions. APIs evolve over time, and correspondingly the API schemas evolve, resulting in multiple schema versions. Managing multiple schema versions is a difficult problem which is discovered in multiple circumstances. For example, a service must in general support multiple versions of its API to allow for all clients to upgrade to the latest API version. In another example, API payloads collected into a big data system must be converted to a common version for analytics and machine learning. The disclosed subject matter describes methods for automating the conversion of semi-structured data from one version to another, which is currently a labor-intensive and error-prone task. Furthermore, the conversion is bi-directional, so a data element in schema version 1 can be converted to schema version 2, and vice versa. This capability may simplify the task of service multiple API versions simultaneously. Alternatively, semi-structured data elements in a big data system can be automatically transformed into the version expected by the analytics software.

Prior approaches to address issues are usually: 1) completely manual or 2) not full-featured. In both cases, the transformation is uni-directional, not bi-directional. As a result, data element conversion from one schema to another involves a great deal of expensive and error-prone code. The costs and lead time for data element conversion increases the cost and lead time for new products, leading to overall increased business costs and time-to-market.

Figure 22:
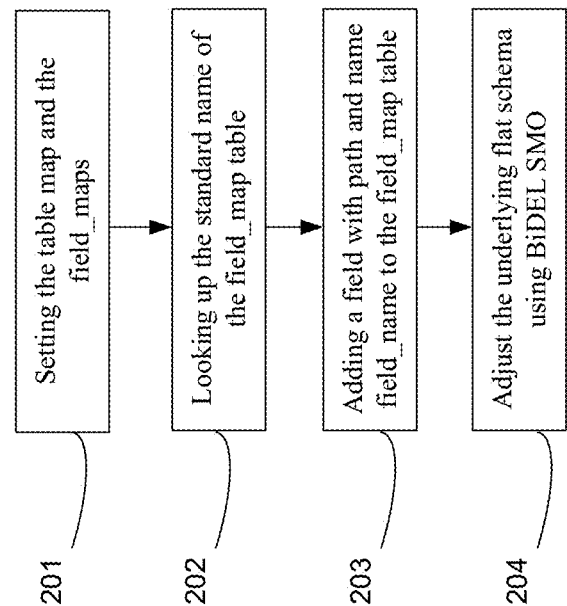
FIG. 22 illustrates an exemplary method using bidirectional SMOs (BiDEL SMOs) in a tree-structured schema.

The disclosed subject matter may assist in bidirectional operations in multiple circumstances, such as adding a field, deleting a field, adding a node, deleting a node, splitting a node, merging nodes, decomposing node, composing a node, moving field internally, or moving node internally, among others. FIG. 22 illustrates an exemplary method using bidirectional SMOs (BiDEL SMOs) in a tree-structured schema. At step 201, setting the table map and the field maps of the version V+1 schema to be that of the version V schema. At step 202, looking up, based on the path, the standard name of the field_map table for version V+1. At step 203, adding a field with path and name field_name to the field map table. A standard name which does not already exist in any version of this field map table should be used.

At step 204, using (e.g., applying) the "Add column" relational SMO (entry 5, BiDEL SMOs) to adjust the underlying flat schema. As disclosed herein, FIG. 10 shows the schema and table maps after applying Add_field(enb/config/cells/geo, height).

Figure 23:
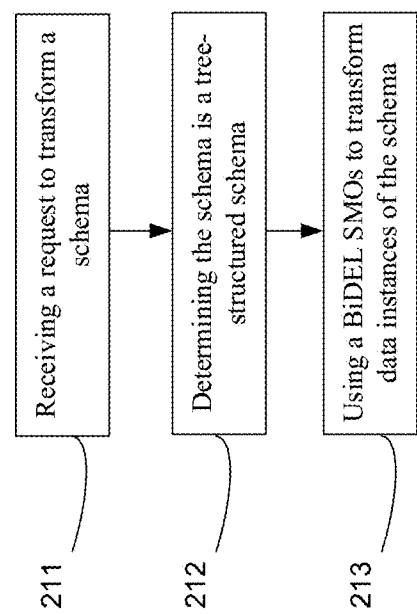
FIG. 23 illustrates an exemplary method using BiDEL SMOs in a tree-structured schema.

FIG. 23 illustrates an exemplary method using bidirectional SMOs (BiDEL SMOs) in a tree-structured schema.

At step 211, receiving a request to transform a schema. The transformation request may include one or more of the following: adding a field, deleting a field, adding a node, deleting a node, splitting a node, merging nodes, decomposing node, composing a node, moving field internally, or moving node internally, among others.

At step 212, determining the schema of step 211 is a tree-structured schema.

At step 213, based on the determining the schema is a tree-structured schema, using at least one of a plurality of BiDEL SMOs to transform data instances of the schema. The transformation of the data instances may be from a first version of the tree-structured schema (e.g., version V) to a second version of the tree-structured schema (e.g., version V+1) or vice versa. The BiDEL SMO set may include the following types of SMOs: 1) Create Table R(field1, . . . , fieldn); 2) Drop Table R; 3) Rename table R into R'; 4) Rename field f into f'; 5) Add column f as G(f1, . . . , fn) into R; 6) Drop column f from R with default G(f1, . . . , fn); 7) Decompose table R into S(s1, . . . , sk), T(t1, . . . , TK) On (join condition); 8) Join table S, T into R on (join condition); 9) Split table R into S, T on (condition); or 10) Merge table S, T into R.

Figure 24:
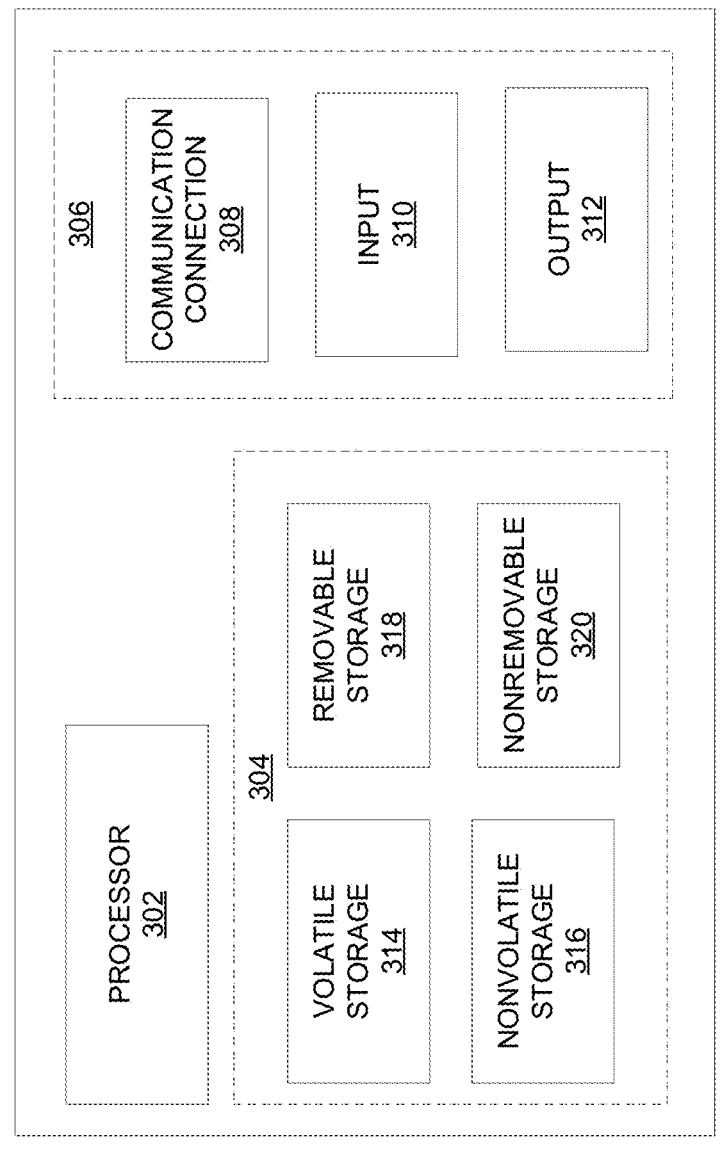
FIG. 24 illustrates a schematic of an exemplary network device.

FIG. 24 is a block diagram of network device 300 that may be connected to or comprise a component of computer system. Network device 300 may comprise hardware or a combination of hardware and software. The functionality to facilitate telecommunications via a telecommunications network may reside in one or combination of network devices 300. Network device 300 depicted in FIG. 24 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 24 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 24) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 25:
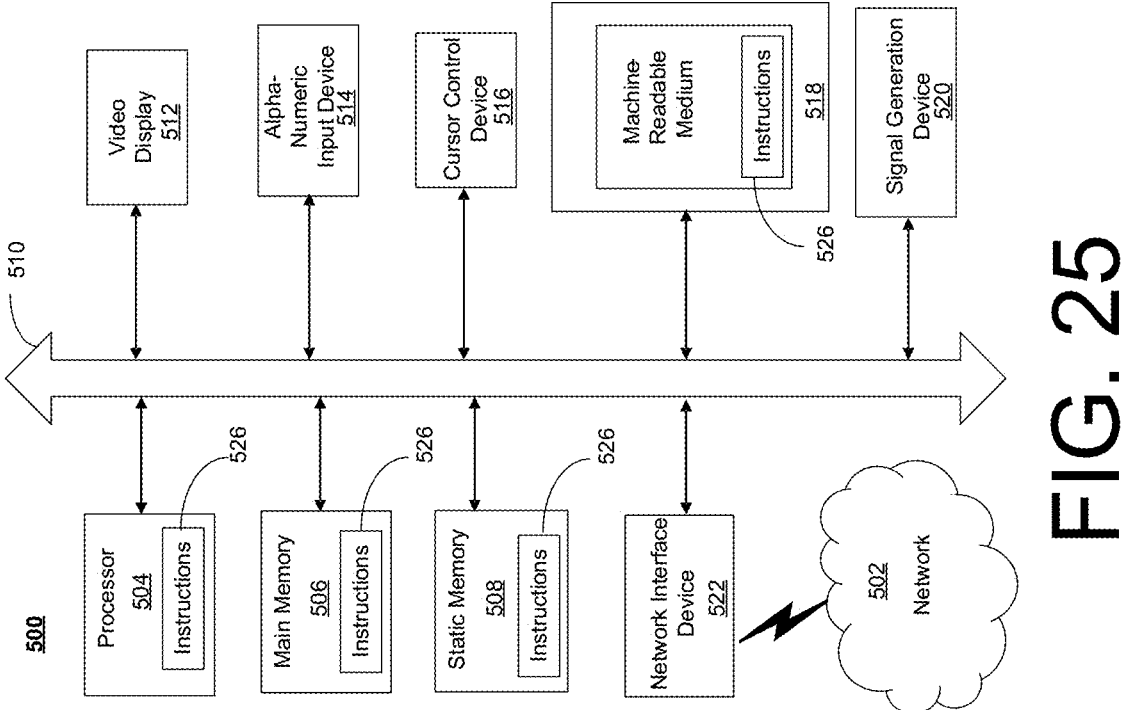
FIG. 25 illustrates an exemplary communication system that provides wireless telecommunication services over wireless communication networks.

FIG. 25 depicts an exemplary diagrammatic representation of a machine in the form of a computer system 500 within which a set of instructions, when executed, may cause the machine to perform any one or more of the methods described above. One or more instances of the machine can operate, for example, as processor 302, servers, and other devices. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which bidirectional schema modification on tree-structured schemas alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—bidirectional schema modification on tree-structured schemas—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing or operating a subscriber storage domain. A system for transforming data instances between two tree-structured schemas using a collection of bidirectional tree-structured SMOs, in which the data may be stored in a relational database, in which the data may be transmitted as part of an API (e.g., not stored for a significant period by translated on the fly), or in which the data may be stored in a document store. A system which uses relational equivalences to facilitate the automatic transformation of data instances between two tree-structured schemas, may further include a system which uses mapping tables to translate between tree-structured data and flat data representations. A system which uses the Change_field_name transformation and so on to the Compose_node operation. Any number of devices (e.g., virtual or physical) may be used to execute the methods herein, such as FIG. 22, or FIG. 23, or other methods described herein. All combinations in this paragraph (including the removal or addition of steps) are contemplated in a manner that is consistent with the other portions of the detailed description.

What is claimed:

1. An apparatus, the apparatus comprising:
a processing system including a processor; and
a memory that stores executable instructions that, when executed by the processing system, facilitate performance of operations, the operations comprising:
receiving a first request from a first application programming interface (API) to access a data instance using a first version of a tree-structured schema stored in a computer-readable medium, the first API executed on a server within a distributed computing environment, the first API utilizing first protocols for data transmission and retrieval, the first API being configured to facilitate data exchange between software applications wherein the first version is associated with a specific application domain and includes predefined schema constraints;
determining that the data instance is stored using the first version of the tree-structured schema, wherein the first version of the tree-structured schema is characterized by a hierarchical structure with no loops and a defined root node;
transmitting the data instance using the first version of the API to satisfy the request from the first API, wherein the transmitting includes transmitting metadata describing the first version of the tree-structured schema;

receiving a second request from a second API to access the data instance using a second version of the tree-structured schema, the second API executed on the server within the distributed computing environment, the second API utilizing second protocols for data transmission and retrieval, the second API being configured to facilitate data exchange between software applications;

determining that the first version of the tree-structured schema includes no loop, wherein the first version of the tree-structured schema comprises a plurality of nodes, each node has a collection of fields, and each field refers to a scalar value, another node, or a list of other nodes; and using at least one of a plurality of bidirectional tree-structured schema modification operations to transform the data instance from the first version of the tree-structured schema to the second version of the tree-structured schema, wherein the transforming the data instance from the first version of the tree-structured schema comprises automatically and bidirectionally transforming the data instance by using at least one first mapping table in JavaScript Object Notation (JSON) format to translate between a first tree-structured data representation according to the first version of the tree-structured schema and a flat data representation of the data instance, and by using at least one second mapping table in JSON format to translate between a second tree-structured data representation according to the second version of the tree-structured schema and the flat data representation of the data instance, wherein the automatically and bidirectionally transforming the data instance by using the at least one first and second mapping tables to translate is based on identifying one or more scalar subtrees starting at a root, wherein for each scalar subtree a record is populated corresponding to the scalar subtree using one of the first or second mapping tables, a foreign key dependence is added on a parent of the scalar subtree, and each child scalar subtree is processed for the current scalar subtree, wherein the automatically and bidirectionally transforming the data instance includes validation of the data instance against the predefined schema constraints, performing detailed type checks to ensure data types are consistent with schema definitions, executing range validations to confirm that numerical values fall within specified limits, conducting structural consistency checks to verify the hierarchical arrangement of nodes, and applying constraint enforcement mechanisms to uphold all specified schema rules, wherein the data instance is transformed to create a transformed data instance, wherein the transformed data instance is not stored in the second version of the tree-structured schema, and wherein the transformed data instance is transmitted using the second API in response to the request to the second API, thereby supporting multiple API versions for use in cellular communications.

2. The apparatus of claim 1, wherein the automatically and bidirectionally transforming the data instance by using the at least one first and second mapping tables to translate is further based on: fetching a relevant record for each scalar subtree starting at the root, for each non-NULL field verifying that an indicated path exists and setting a corresponding path value to a value in the relevant record, and processing a corresponding record in a child subtree for each subtable having records linked to the relevant record.

3. The apparatus of claim 1, wherein the transforming the data instance comprises adding a node or deleting a node bidirectionally.

4. The apparatus of claim 1, wherein the transforming the data instance comprises splitting a node or merging nodes bidirectionally.

5. The apparatus of claim 1, wherein the transforming the data instance comprises decomposing node or composing a node bidirectionally.

6. The apparatus of claim 1, wherein the at least one of a plurality of bidirectional tree-structured schema modification operations comprises an "add column" relational schema modification operation bidirectionally.

7. The apparatus of claim 1, wherein the at least one of a plurality of bidirectional tree-structured schema modification operations comprises an "create table" relational schema modification operation bidirectionally.

8. A method comprising:

receiving, by a processing system including a processor, a first request from a first application programming interface (API) to access a data instance using a first version of a tree-structured schema stored in a computer-readable medium, the first API executed on a server within a distributed computing environment, the first API utilizing first protocols for data transmission and retrieval, the first API being configured to facilitate data exchange between software applications wherein the first version is associated with a specific application domain and includes predefined schema constraints;

determining, by the processing system, that the data instance is stored using the first version of the tree-structured schema, wherein the first version of the tree-structured schema is characterized by a hierarchical structure with no loops and a defined root node;

transmitting, by the processing system, the data instance using the first version of the API to satisfy the request from the first API, wherein the transmitting includes transmitting metadata describing the first version of the tree-structured schema;

receiving, by the processing system, a second request from a second API to access the data instance using a second version of the tree-structured schema, the second API executed on the server within the distributed computing environment, the second API utilizing second protocols for data transmission and retrieval, the second API being configured to facilitate data exchange between software applications;

determining, by the processing system, that the first version of the tree-structured schema includes no loop, wherein the first version of the tree-structured schema comprises a plurality of nodes, each node has a collection of fields, and each field refers to a scalar value, another node, or a list of other nodes; and using, by the processing system, at least one of a plurality of bidirectional tree-structured schema modification operations to transform the data instance from the first version of the tree-structured schema to the second version of the tree-structured schema, wherein the transforming the data instance from the first version of the tree-structured schema comprises automatically and bidirectionally transforming, by the processing system, the data instance by using at least one mapping table in JavaScript Object Notation (JSON) format to translate between a first tree-structured data representation according to the first version of the tree-structured schema and a flat data representation of the data instance, and by using at least one second mapping table in JSON format to translate between a second tree-structured data representation according to the second version of the tree-structured schema and the flat data representation of the data instance, wherein the automatically and bidirectionally transforming the data instance by using the at least one first and second mapping tables to translate is based on identifying one or more scalar subtrees starting at a root, wherein for each scalar subtree a record is populated corresponding to the scalar subtree using one of the first or second mapping tables, a foreign key dependence is added on a parent of the scalar subtree, and each child scalar subtree is processed for the current scalar subtree, wherein the automatically and bidirectionally transforming the data instance includes validation of the data instance against the predefined schema constraints, performing detailed type checks to ensure data types are consistent with schema definitions, executing range validations to confirm that numerical values fall within specified limits, conducting structural consistency checks to verify the hierarchical arrangement of nodes, and applying constraint enforcement mechanisms to uphold all specified schema rules, wherein the data instance is transformed to create a transformed data instance, wherein the transformed data instance is not stored in the second version of the tree-structured schema, and wherein the transformed data instance is transmitted using the second API, thereby supporting multiple API versions for use in cellular communications.

9. The method of claim 8, wherein the transforming the data instance comprises adding a field or deleting a field bidirectionally.

10. The method of claim 8, wherein the transforming the data instance comprises adding a node or deleting a node bidirectionally.

11. The method of claim 8, wherein the transforming the data instance comprises splitting a node or merging nodes bidirectionally.

12. The method of claim 8, wherein the transforming the data instance comprises decomposing node or composing a node bidirectionally.

13. The method of claim 8, wherein the at least one of a plurality of bidirectional tree-structured schema modification operations comprises an "add column" relational schema modification operation.

14. The method of claim 8, wherein the at least one of a plurality of bidirectional tree-structured schema modification operations comprises an "create table" relational schema modification operation.

15. A computer readable storage medium, storing executable instructions that, when executed by a processing system including a processor, facilitate performance of operations, the operations comprising:

receiving a first request from a first application programming interface (API) to access a data instance using a first version of a tree-structured schema stored in a computer-readable medium, the first API executed on a server within a distributed computing environment, the first API utilizing first protocols for data transmission and retrieval, the first API being configured to facilitate data exchange between software applications wherein the first version is associated with a specific application domain and includes predefined schema constraints;

determining that the data instance is stored using the first version of the tree-structured schema, wherein the first version of the tree-structured schema is characterized by a hierarchical structure with no loops and a defined root node;

transmitting the data instance using the first version of the API to satisfy the request from the first API, wherein the transmitting includes transmitting metadata describing the first version of the tree-structured schema;

receiving a second request from a second API to access the data instance using a second version of the tree-structured schema, the second API executed on the server within the distributed computing environment, the second API utilizing second protocols for data transmission and retrieval, the second API being configured to facilitate data exchange between software applications;

determining that the first version of the tree-structured schema includes no loop, wherein the first version of the tree-structured schema comprises a plurality of nodes, each node has a collection of fields, and each field refers to a scalar value, another node, or a list of other nodes; and using at least one of a plurality of bidirectional tree-structured schema modification operations to transform the data instance from the first version of the tree-structure schema to the second version of the tree-structured schema, wherein the transforming the data instance from the first version of the tree-structured schema comprises automatically and bidirectionally transforming the data instance by using at least one mapping table in JavaScript Object Notation (JSON) format to translate between a first tree-structured data representation according to the first version of the tree-structured schema and a flat data representation of the data instance, and by using at least one second mapping table in JSON format to translate between a second tree-structured data representation according to the second version of the tree-structured schema and the flat data representation of the data instance, wherein the automatically and bidirectionally transforming the data instance by using the at least one first and second mapping tables to translate is based on identifying one or more scalar subtrees starting at a root, wherein for each scalar subtree a record is populated corresponding to the scalar subtree using one of the first or second mapping tables, a foreign key dependence is added on a parent of the scalar subtree, and each child scalar subtree is processed for the current scalar subtree, wherein the automatically and bidirectionally transforming the data instance includes validation of the data instance against the predefined schema constraints, performing detailed type checks to ensure data types are consistent with schema definitions, executing range validations to confirm that numerical values fall within specified limits, conducting structural consistency checks to verify the hierarchical arrangement of nodes, and applying constraint enforcement mechanisms to uphold all specified schema rules, wherein the data instance is transformed to create a transformed data instance, wherein the transformed data instance is not stored in the second version of the tree-structured schema, and wherein the transformed data instance is transmitted using the second API, thereby supporting multiple API versions for use in cellular communications.

16. The computer readable storage medium of claim 15, wherein the transforming the data instance comprises adding a field or deleting a field bidirectionally.

17. The computer readable storage medium of claim 15, wherein the transforming the data instance comprises adding a node or deleting a node bidirectionally.

18. The computer readable storage medium of claim 15, wherein the transforming the data instance comprises splitting a node or merging nodes bidirectionally.

19. The computer readable storage medium of claim 15, wherein the transforming the data instance comprises decomposing node or composing a node bidirectionally.

20. The computer readable storage medium of claim 15, wherein the at least one of a plurality of bidirectional tree-structured schema modification operations comprises an "add column" relational schema modification operation.

* * * * *